3,308,079
Patented Mar. 7, 1967

3,308,079
RELEASE COATING COMPOSITION COMPRISING (1) A DIORGANOPOLYSILOXANE, (2) A PHENYLMETHYLPOLYSILOXANE AND (3) AN ORGANOSILOXANE BLOCK COPOLYMER
Sharon R. Haenni, Midland, Mich., assignor to Dow Corning Corporation, Midland, Mich., a corporation of Michigan
No Drawing. Filed Jan. 4, 1965, Ser. No. 423,363
73 Claims. (Cl. 260—29.1)

This invention relates to a release coating comprising an organosiloxane resin, a dimethylpolysiloxane fluid and a phenylmethylpolysiloxane.

Many of the recent inventions and developments in the manufacture of consumer products have been directed to reducing the time a housewife spends at necessary tasks around the home and to reducing the amount of labor involved in such tasks. The housewife spends much of her time preparing meals for the family, and hence, uses the kitchen stove for cooking the food. When the food is cooked, whether or not the housewife uses caution, some of the food, because of its nature will inherently stick, char, or in some manner adhere firmly to the cooking utensils, or to a warm or hot area of the stove where it is accidentally spilled, or where it has cooked out of the container. In cleaning up the cooking utensils and the area of the stove where the food has adhered, strong cleaners are required, such cleaners include, scouring powder, ammonia, caustic and steel wool. When caustic and ammonia are required to remove the food, there is always a health danger to the person using these cleaners. Caustic and ammonia are particularly dangerous cleaning agents to have around the home. These cleaning agents can cause severe damage to a person using them; ranging from severe burns, to blindness and even death. Such cleaning agents are certainly not desirable when children live in the home. Besides the dangers with using caustic and ammonia, a housewife finds that using steel wool is an exhausting task and too much for her to cope with. This is particularly true when the area to be cleaned is the oven. Along with steel wool some other cleaning agent is required, such as a scouring powder. The bottom of the oven can be reached readily and a sufficient amount of of pressure can be applied by the housewife when using steel wool, but the upper sides, the back and the top of the oven are difficult areas to reach and apply a sufficient pressure when using steel wool. Thus, many oven cleaners are being offered to the consumers to aid in cleaning, but these oven cleaners are high potency solvents, strong detergents, caustic, and ammonia, many of which are difficult to use. The housewife, both for convenience and savings, would rather just use an ordinary household scouring powder and not have a different cleaner for each job.

Many foods which stick or char in cooking utensils, such as meats, eggs, sauces, candy, etc., particularly when fried or broiled, can be cleaned with strong scouring powders, a scouring pad, elbow-grease and perseverance. Aids to prevent adherence of food to cooking utensils, such as skillets, have been developed. One aid to prevent sticking in cooking utensils is polytetrafluoroethylene. The polytetrafluoroethylene is coated on the utensil as purchased. These polytetrafluoroethylene coated cooking utensils are very good for preventing charred food from adhering to the utensil surfaces, but the utensil needs to be used very cautiously to prevent scraping the coating from the surface. The ordinary spatulas and the like, cannot be used with these coated utensiles. Special plastic or wooden implements must be purchased to prevent scratching or scraping. Once the coating is removed the food will immediately adhere to the unprotected areas, thus, the effectiveness of the coating is lost. The coating will also stain from various foods and once stained, there is no way to remove the stains except by removing the coating. If the coating is removed, the surface will have no release properties. If the coating is removed, the replacement of the coating, or the repair of this coating is very difficult.

The baking oven is probably the most difficult to get clean from spilled greases, grease film from roasting, charred droppings from pies and other high sugar content foods which require baking, etc. Today many oven cleaners are on the market which consist of high potency solvents and caustics, as well as, the old standby, steel wool. The problem with high potency cleaners and steel wool is that they are only useful after the charred material and grease has adhered firmly to the oven surface. The real need of the housewife is something to prevent the food from adhering firmly to the oven surface. Although there are many release materials which will aid in the release of food from cooking utensiles, these materials are not useful in preventing food from adhering to oven surfaces. Some of these release materials which have been used, include vegetable fats and oils; animal fats and oils; conventional silicone resins; and conventional silicone fluids and other synthetic oils. Most of the above release materials will function in one way or another, with limited utility and limited success. The vegetable and animal fats and oils will in themselves, char and adhere to hot surfaces, because they are thermally unstable. The conventional silicone resins require cure to provide release properties and thus resemble polytetrafluoroethylene. The conventional silicone fluids provide limited release and limited durability. None of the known release materials now available will provide satisfactory release for use in an oven. The oven is one of the severest tests a release material can be subjected to for the release of food.

The properties of an oven release coating should be as follows:

(1) The coating should be clear and preferably colorless.

(2) The coating should be heat-stable, should have viscosity stability, should not decompose at 600° F. and preferably 800° F.

(3) The coating should be easy to apply to the oven surface such as by an aerosol spray or by an applicator such as a cloth or a felt pad.

(4) The coating should be durable. It should last and be effective over a long period, even at high temperatures. It should also provide release repeatedly from the same spot.

(5) The coating should adhere firmly to the oven surface, whether metal, enamel or porcelain.

(6) The coating should be easily removed from the oven surface by a housewife when necessary.

(7) The coating should be have excellent food release properties for charred on food, such as greases and sugar-containing foods.

(8) The coating material should have good shelf stability.

(9) The coating should be easy to replace, either entirely, or in particular areas.

(10) The coating should provide some stain resistance.

(11) The coating should be applicable to a surface which is not clean in every aspect.

(12) The coating material should be non-toxic.

(13) The coating material should be non-flammable. This does not influence the properties of the release material, but provides for a safe household item.

(14) The coating material should be economical.

An object of this invention is to provide a release material. Another object is to provide a release material for the release of food from surfaces. Another object is to provide a release material suitable to prevent food from adhering to hot surfaces. Another object is to provide a release material which is suitable for use in an oven to prevent food from adhering to the oven surfaces. Another object is to provide a release material which is clear, heat stable, easy to apply, durable, has good adhesion while still being easy to remove, excellent release of food, good shelf stability, reapplicable and non-toxic.

Still another object is to provide a release material which can be applied from an aerosol spray. Still another object is to provide a release material which can be applied from solution and from an emulsion. Still another object is to provide a release material which will clean a surface when applied, and will deposit a coating to provide release properties. These and other objects will become apparent from the following detailed description of the present invention and the appended claims.

The present invention relates to a release material consisting essentially of (A) A diorganopolysiloxane of the unit formula $$R_nSiO_{4-n-m/2}(OH)_m$$

wherein R is a monovalent radical selected from the group consisting of alkyl radicals, alkenyl radicals, and aryl radicals, $n$ has an average value from 1.98 to 2.0145 inclusive, at least 90 percent of the silicon atoms having two methyl radicals per silicon atom bonded to the silicon atom through silicon-carbon bonds, $m$ has an average value of not more than 0.02, the sum of $m+n$ does not exceed 2.0145, said diorganopolysiloxane having a viscosity of at least 350 cs. at 25° C., there being no more than 2 mol percent of the units with alkenyl radicals attached to the silicon atom through silicon-carbon bonds, (B) A phenylmethylpolysiloxane of the unit formula $$(C_6H_5)_x(CH_3)_ySiO_{4-x-y/2}$$

wherein $x$ has an average value from 0.08 to 1.1 inclusive, $y$ has an average value from 0.9 to 1.92 inclusive, the sum of $x+y$ is 2, said phenylmethylpolysiloxane being endblocked with groups selected from the group consisting of hydroxyl radicals and triorganosiloxy units selected from the group consisting of $(CH_3)_3SiO_{0.5}$, $(C_6H_5)(CH_3)_2SiO_{0.5}$, $(C_6H_5)_2(CH_3)SiO_{0.5}$ and $(C_6H_5)_3SiO_{0.5}$, said phenylmethylpolysiloxane having a viscosity at 25° C. of at least 50 cs., and (C) A block copolymer consisting essentially of
(1) Polymer blocks of the average structure $$[(CH_3)_2SiO]_s[R'_2SiO]_t[R'SiO_{1.5}]_u$$

wherein R' is a monovalent radical selected from the group consisting of methyl, ethyl, vinyl and phenyl radicals, the sum of $s+t+u$ has an average value from 6 to 100 inclusive, and $t$ and $u$ each have a value of up to 10 percent of the sum of $s+t+u$, (2) Polymer blocks of the average unit formula $$(C_6H_5)_qSiO_{4-w-q/2}(CH_3)_w$$

wherein $q$ has an average value from 1 to 1.25 inclusive, $w$ has an average value of up to 0.25 and the sum of $q+w$ does not exceed 1.25, the siloxane units in (1) being from 10 to 75 mol percent and the siloxane units (2) being from 25 to 90 mol percent of the total siloxane units in said block copolymer, the minimum mol percent of siloxane units (2), when the sum of $s+t+u$ has an average value of from 50 to 100 being determined by the equation $50M/S+0.1S=30$, where M is the minimum mol percent of siloxane units (2), and S is the sum of $s+t=u$, there being present 10 to 85 inclusive weight percent of (A), 2 to 55 inclusive weight percent of (B), and 5 to 85 inclusive weight percent of (C), each based on the combined weight of $(A)+(B)+(C)$.

The release materials of the present invention are prepared by mixing the three ingredients in any conventional manner.

The diorganopolysiloxane (A) is essentially a dimethylpolysiloxane of the unit formula $$R_nSiO_{4-n-m/2}(OH)_m$$

where $n$ has an average value from 1.98 to 2.0145, $m$ has an average value of not more than 0.02. Preferably, $n$ has an average value from 1.98 to 2.0121 inclusive, and most preferably, $n$ has an average value from 1.99 to 2.0098 inclusive. Preferably, $m$ has an average value from 0 to $n-2.000$. The sum of $m+n$ does not exceed 2.0145. Preferably, the sum of $m+n$ does not exceed 2.0121, and most preferably, the sum of $m+n$ does not exceed 2.0098. Particularly useful diorganopolysiloxanes are those in which $n$ has an average value from 2.000 to 2.0121 inclusive.

The diorganopolysiloxane (A) has approximately two silicon-bonded monovalent organic radicals per silicon atom. The diorganopolysiloxane (A) is composed essentially of $R_2SiO$ units, but can also have $R_3SiO_{0.5}$ units, $RSiO_{1.5}$ units and $SiO_2$ units. The diorganopolysiloxanes (A) are soluble in organic solvents conventionally used for organosiloxanes. When units other than $R_2SiO$ are present, they should not be present in such large amounts that the diorganopolysiloxane loses its essentially linear character, and so that the value of $n$ falls outside the required range. Preferably, $R_3SiO_{0.5}$, $RSiO_{1.5}$ and $SiO_2$ units are present in no more than 5 mol percent. The most desirable diorganopolysiloxanes (A) are those having the structural formula $R_3SiO[R_2SiO]_pSiR_3$, wherein $p$ is an integer having an average value greater than 135. Preferably, $p$ has an average value greater than 165, and most preferably p has an average value greater than 205. A particularly preferred range of $p$ for aerosol compositions is from 225 to 1635 and most preferred range of $p$ is from 225 to 1000. Other preferred operable diorganopolysiloxanes are those having a structural formula $$HO[R_2SiO]_pH$$

wherein p has the same values as above. Another preferred operable diorganopolysiloxanes (A) are those having the structural formula $HO[R_2SiO]_pSiR_3$, wherein $p$ has the same values as defined above. By definition the diorganopolysiloxanes are either $R_3SiO_{0.5}$ endblocked or HO-endblocked. The average unit formula in which $n$ has a value greater than 2.0000 requires that there be present $R_3SiO_{0.5}$ endblocking groups. The larger the value of $n$ when $n$ exceeds 2.0, the smaller the average molecular weight of the diorganopolysiloxane (A). The diorganopolysiloxane (A) is usually composed of a mixture of polysiloxanes of varying molecular weights having an average value such that the above limitations are maintained. Because the diorganopolysiloxane (A) is usually a mixture, the exact value of p as defined above is an average value. The value of $p$ is difficult to measure, therefore, the size of the polysiloxane can best be determined by viscosity. The viscosity of the diorganopolysiloxane (A) must be at least 350 cs. at 25° C. If the viscosity is less than 350 cs. at 25° C., the release material no longer has satisfactory durability or release properties. Preferably, the viscosity is at least 500 cs. at 25° C. and the best results are obtained when the viscosity is at least 1000 cs. at 25° C.

The diorganopolysiloxane (A) must have at least 90 mol percent of the organosiloxane units present as dimethylsiloxane units. The monovalent radicals, R, can be alkyl radicals such as methyl, ethyl, propyl and hexyl, alkeny radicals such as vinyl or allyl, aryl radicals such as phenyl, tolyl, xylyl or naphthyl. The preferred monovalent radicals for R are methyl, phenyl and vinyl. There must not be more than 10 percent of the silicon atoms bonded to monovalent radicals other than methyl radicals. Diorganopolysiloxanes (A) containing less than 90 mol percent dimethylsiloxane units do not provide a polysiloxane with satisfactory heat stability and durability. The diorganopolysiloxane (A) must not have more than 2 mol percent alkenyl radicals as greater amounts reduce the release properties of the release material such that little or no release property remains.

The diorganopolysiloxane (A) of the present invention can contain hydroxyl radicals bonded to the silicon atoms through a silicon-oxygen bond. The hydroxyl radicals preferably are present only as endblocking groups, but operable diorganopolysiloxane can have up to 0.02 silicon-bonded hydroxyl radicals per silicon atom. When the amount of hydroxyl radical per silicon atom is greater than 0.02, the release material has a tendency to cure. The release material when cured on a surface is very difficult to remove from the surface to which it has been applied.

The diorganopolysiloxane (A) can be composed of the organosiloxane units, as $(CH_3)_2SiO$, $(CH_3)_3SiO_{0.5}$, $$CH_3SiO_{1.5}, C_6H_5SiO_{1.5}, (C_6H_5)(CH_3)SiO,$$
$$(C_6H_5)_2SiO, (C_6H_5)(CH_3)_2SiO_{0.5},$$
$$(CH_2=CH)(CH_3)_2SiO_{0.5}, (CH_2=CH)(CH_3)SiO,$$
$$CH_2=CHSiO_{1.5}, (CH_3CH_2)(CH_3)SiO,$$

$CH_3C_6H_5)(CH_3)SiO$, $SiO_2$ and $(CH_3CH_2)(CH_3)_2SiO_{0.5}$. The preferred organosiloxane units are $(CH_3)_2SiO$, $(CH_3)_3SiO_{0.5}$ and $CH_3SiO_{1.5}$.

The phenylmethylpolysiloxane (B) has the unit formula $$(C_6H_5)_x(CH_3)_ySiO_{4-x-y/2}$$

wherein $x$ is from 0.08 to 1.1 inclusive and $y$ is from 0.9 to 1.92 and the sum of $x+y$ is 2. When the value of $x$ is less than 0.08, the release material loses its durability and is no longer satisfactory for a release coating, particularly in ovens. When the value of $x$ is greater than 1.1, the release material is difficult to apply, and the properties are not satisfactory. Preferably, $x$ is from 0.5 to 1.0 and $y$ is from 1.0 to 1.5. Within the limits of $x$ and $y$, the phenylmethylpolysiloxane can be composed of siloxane units such as $(C_6H_5)(CH_3)SiO$, $(CH_3)_2SiO$, $(C_6H_5)_2SiO$, and small amounts of $C_6H_5SiO_{1.5}$, $$CH_3SiO_{1.5} \ (CH_3)_3SiO_{0.5}, \ (C_6H_4)(CH_3)_2SiO_{0.5},$$

$(C_6H_5)_2(CH_3)SiO_{0.5}$ and $(C_6H_5)_3SiO_{0.5}$, as long as the sum of $x+y$ is 2. Small amount, preferably meaning less than 5 mol percent. The phenylmethylpolysiloxane is endblocked with triorganosiloxy units such as $$(CH_3)_3SiO_{0.5}, \ (C_6H_5)(CH_3)_2SiO_{0.5},$$

$(C_6H_5)_2(CH_3)SiO_{0.5}$ and $(C_6H_5)_3SiO_{0.5}$, or hydroxyl radicals, preferably triorganosiloxy units. The phenylmethylpolysiloxane (B) is essentially a linear polysiloxane. It is to be understood that essentially linear means that there are practically no cyclic polysiloxanes present. Preferred phenylmethylpolysiloxanes have structural formulae of $(CH_3)_3SiO[(C_6H_5)(CH_3)SiO]_jSi(CH_3)_3$ and $$(C_6H_5)(CH_3)_2SiO[(C_6H_5)(CH_3)SiO]_jSi(CH_3)_2(C_6H_5)$$

wherein $j$ has such a value that the viscosity is at least 400 cs. at 25° C. As with the diorganopolysiloxane (A), the phenylmethylpolysiloxane (B) is usually a mixture of various molecular weight polymers and thus, an exact molecular weight is difficult o obtain. The phenylmethylpolysiloxane must have a viscosity of at least 50 cs. at 25° C. to be operable. Preferably, the viscosity is at least 400 cs. at 25° C. A particularly preferred range of the viscosity for aerosol compositions has an upper limit of 750,000 cs. at 25° C. Release materials prepared with a phenylmethylpolysiloxane having a viscosity lower than 50 cs. at 25° C. are not heat stable, are not durable, and will not provide satisfactory release.

The upper viscosity limit of the phenylmethylpolysiloxane is determined only by whether or not it is practical to use, to apply the release material made with it, to make it and to its solubility when solvents are used.

The block copolymer (C) is a block copolymer composed of polymer blocks (1) having a structure $$[(CH_3)_2SiO]_s[R_2'SiO]_t[R'SiO_{1.5}]_u$$

wherein R' is a monovalent radical selected from the group consisting of methyl, ethyl, vinyl and phenyl, the sum of $s+t+u$ is from 6 to 100 inclusive, and $t$ and $u$ each have a value up to 10 percent of the sum of $s+t+u$. The lower limit of the sum of $s+t+u$ required is 6, in that the essential block copolymer properties are lost when less than 6 siloxane units are used. The specific characteristics of the block copolymers are critical in the present invention. When 100 is exceeded for the sum of $s+t+u$, the resulting products are inoperative. Preferably, the sum of $s+t+u$ is from 20 to 75 inclusive, and most preferably, the sum of $s+t+u$ is from 20 to 50 inclusive. The polymer blocks must be essentially dimethylsiloxane. Small amounts of other units containing methyl, ethyl, vinyl and phenyl radicals can be tolerated when present in amounts preferably less than 10 mols percent of the total siloxane units of (1). Such units can be $$(C_6H_5)(CH_3)SiO, (C_6H_5)_2SiO, (CH_2=CH)(CH_3)SiO,$$
$$(CH_3CH_2)_2SiO, (CH_3CH_2)(CH_3)SiO,$$
$$(C_6H_5)(CH_3CH_2)SiO, C_5H_5SiO_{1.5}, CH_3SiO_{1.5},$$

$CH_3CH_2SiO_{1.5}$ and $CH_2=CHSiO_{1.5}$. Therefore, $t$ and $u$ are not greater than 10 percent of the sum of $s+t+u$. Preferably, the $R'_2SiO$ and $R'SiO_{1.5}$ units are present in amounts less than 5 mol percent. When other units replace the dimethylsiloxane units in polymer block (1), the location of these units in the polymer chain is not critical. Most preferably, the polymer block (1) contains only dimethylsiloxane units.

The polymer block (2) has the average unit formula $$(C_6H_5)_qSiO_{4-w-q/2}^{(CH_3)_w}$$

wherein $q$ has an average value from 1 to 1.25 inclusive, and $w$ has an average value up to 0.25 and the sum of $q+w$ does not exceed 1.25. Preferably, $q$ has an average value from 1 to 1.20 inclusive, $w$ has an average value up to 0.20 and the sum of $w+q$ is 1.20. Polymer blocks (2) are mainly composed of $(C_6H_5)SiO_{1.5}$ units, but other units such as $(C_6H_5)(CH_3)SiO$, $CH_3SiO_{1.5}$ and $(C_6H_5)_2SiO$ can also be present in amount less than 25 mol percent based on the total number of units in polymer block (2). The location of $(C_6H_5)(CH_3)SiO$, $(C_6H_5)_2SiO$ and $(CH_3)SiO_{1.5}$ units is not critical in the polymer block (2). It is preferred that polymer block (2) contain from 2 to 20 mol percent based on the total number of siloxane units of (2) of $(C_6H_5)(CH_3)SiO$ units. Thus, $q$ has an average value from 1 to 1.18 inclusive, $w$ has an average value from 0.02 to 0.20 inclusive and the sum of $q+w$ does not exceed 1.20. The best results are achieved with from 4 to 15 mol percent $(C_6H_5)(CH_3)SiO$ units. Thus, $q$ has an average value from 1 to 1.11 inclusive, $w$ has an average value from 0.04 to 0.15 inclusive and the sum of $w+q$ does not exceed 1.15.

The average size of the polymer block (2) is dependent on the average size of blocks (1) and the mol percentage of (1) and (2). It has been found that when these variables are fixed that the average block size of (2) is also fixed, and therefore specification of the block size of (2) is redundant.

The block copolymer (C) is composed of 10 to 75 mol percent based on the total number of siloxane units of polymer block (1). When less than 10 mol percent of polymer block (1) is present, the release material has very poor release and has unsatisfactory durability. When more than 75 mol percent of the block copolymer is composed of (1) unit, the release material has unsatisfactory release. The maximum mol percent of (1) unit present in the block copolymer is closely related to the average number of siloxane units per block (1), particularly when the average number of siloxane units per block (1) is from 50 to 100 inclusive units. The block copolymers (C) are essentially composed of two types of blocks, specifically those blocks containing essentially dimethylsiloxane units (1) and those blocks containing essentially monophenylsiloxane units (2), where essentially monophenylsiloxanes includes up to 25 mol percent phenylmethylsiloxane units. When the mol percent of either (1) units or (2) units is fixed, the other mol percent is immediately known. The minimum mol percent of siloxane units (2), when the average number of units per block (1) is from 50 to 100 units, is determined by the equation $50M/S+0.1S=30$, where M is the minimum mol percent of siloxane units (2) and S is the sum of $s+t+u$. The maximum mol percent of siloxane units (1) when the average number of units per block (1) is from 50 to 100 units is equal to 100 minus the minimum mol percent of siloxane units (2). For example, when $s+t+u$ is equal to 80, the minimum mol percent of siloxane units (2) is 35.2 mol percent and the maximum mol percent of siloxane units (1) is 64.8 mol percent. The equation shown above only applies when the average number of units per block (1) is from 50 to 100 units. When the average number of units per block (1) is below 50 units, the equation is not applicable. The minimum mol percent of polymer block (1) and the maximum mol percent of polymer block (2) is not in any manner altered. The minimum mol percent of siloxane units (2) determine that percentage below which the block copolymers provide operable release materials of the present invention. A preferred range is from 25 to 65 mol percent of (1) with the balance (2).

The release material of the present invention is prepared by mixing in any conventional manner 10 to 85 weight percent of (A), 2 to 55 weight percent of (B) and 5 to 85 weight percent of (C). When the amounts of (A), (B) or (C) are not within the limits as set forth above, a release material prepared with amounts of (A), (B) or (C) outside the required limits has poor durability, poor release properties, or both. The preferred release materials are those having 20 to 85 weight percent of (A), 4 to 50 weight percent of (B) and 5 to 65 weight percent of (C). The most preferred release materials are those having 45 to 85 weight percent (A), 5 to 20 weight percent of (B) and 5 to 50 weight percent of (C).

The diorganopolysiloxanes of (A) and the phenylmethylpolysiloxanes of (B) are well known in the art and can be purchased commercially. For instance, the hydroxyl-containing polysiloxane of (A) can be prepared as shown by U.S. Patents Nos. 2,779,776 and 2,863,897, or any of the polysiloxanes of (A) and (B) can be prepared as shown in "Silicones," by R. N. Meals and F. M. Lewis, Reinhold Publishing Corporation, New York, chapter 3.

The block copolymers of (C) can be prepared by several methods. Methods for the preparation of block copolymer (C) are described in copending application of Harold L. Vincent, Serial No. 361,258, filed April 20, 1964, entitled "New Organosilicon Resins," which is hereby fully incorporated by reference. One method comprises reacting $(C_6H_5)SiX_3$ wherein X is a halogen atom with a hydroxylated polysiloxane of the average structure $$[(CH_3)_2SiO]_a[(CH_3)(C_6H_5)SiO]_b[(CH_3)SiO_{1.5}]_c$$

wherein the sum of $a+b+c$ has an average value from 6 to 50, and b and c can have a value up to 10 percent of the sum of $a+b+c$. There is at least two hydroxyl radicals per molecule in the hydroxylated polysiloxane. There is at least one mol of $(C_6H_5)SiX_3$ per mol of silicon-bonded hydroxyl radicals in the hydroxylated polysiloxane. The reaction can be carried out at any temperature including room temperature. The hydroxylated polysiloxane is usually added to the silane. Since the reaction is exothermic an organic solvent is generally used. The solvents should be essentially moisture-free, should dissolve the reactants and the product and should be immiscible with water so that it can be employed in the hydrolysis step which follows. Suitable solvents include hydrocarbons such as heptane, cyclohexane, methylcyclopentane, benzene, toluene, xylene, naphtha and mineral spirits; halocarbons and halohydrocarbons such as perchloroethylene, tetrachlorodifluoroethane, trichlorotrifluoroethane and chlorobenzene, ethers such as diethyl ether and methylamyl ether; halogenated ethers such as 2,2'-dibromodiethyl ether; and esters such as butyl acetate. When a solvent is used in the above reaction that is miscible with water (e.g. tetrahydrofuran, acetonitrile, ethylene glycol, dimethyl ether, etc.), another water immiscible solvent can be added prior to, during or just subsequent to the hydrolysis step, if desired. However, this solvent is not necessary. The by-produced hydrohalide can be removed by trapping, as, for example, an amine hydrochloride. Thus, there can be included in with the reactants a hydrogen halide acceptor such as pyridine, picoline, morpholine, tributylamine or other tertiary amines. Dry ammonia can also be employed. One of the simplest methods is to let the by-produced hydrogen halide escape as a gas. Often, it is advantageous to sparge the reaction vessel with a dry inert gas during the reaction to aid in the rapid removal of the by-produced hydrogen halide.

The product from the above reaction is cohydrolyzed with a halosilane of the formula

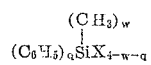

wherein X is defined above, q has an average value from 1 to 1.25, w has an average value up to 0.25 and the sum of $q+w$ does not exceed 1.25. The values for w and q include the silane added in the first reaction. The total mol percent of silicon atom in $C_6H_5SiX_3$ of the first reaction, and $(CH_3)_w(C_6H_5)_qSiX_{4-x-q}$ from the cohydrolysis step comprises 25 to 90 mol percent of the total number of silicon atoms present. The mol percent of the silicon atoms in the hydroxylated polysiloxane comprise from 10 to 75 mol percent of the total number of silicon atoms present. The cohydrolysis is carried out by mixing the product from the first reaction with the silane $$(C_6H_5)_q(CH_3)_wSiX_{4-w-q}$$

and then contacting the mixture with water. There should be enough water to allow hydrolysis of all the halosilane in the mixture. Preferably, there is an excess of water over this minimum amount. An acid acceptor can be present during the cohydrolysis step, if desired. This is not required, however, particularly if an excess of water is employed. As is apparent from the above discussion, all of the silane can be added during the first reaction, thus, the silane will be present in unreacted form and no silane need be added for the cohydrolysis step. When silanes other than phenyltrichlorosilane are used, it is desirable to add these silanes after the first reaction. These silanes can include, diphenyldichlorosilane, phenylmethyldichlorosilane and monomethyltrichlorosilane. The cohydrolysis step produces the block copolymers (C) used in the present invention. If a solvent that is immiscible with water has been used, the composition is in solution and can be used in preparing the release material if an organic solvent solution is desired and if the solvent is the correct solvent desired. The desired organic solvent can be chosen at the beginning so that a solvent change need not be undertaken. The block copolymers can also be recovered in solid form by evaporation of the organic solvents by conventional evaporation techniques.

Another method described in copending application, Serial No. 361,258, filed April 20, 1964, is similar to the above method except that alkoxylated silanes are used instead of the halosilanes. The alkoxylated silanes are the same as the halosilanes except that alkoxy radicals and/or alkyl—O—CH₂CH₂O— radicals replace the halogen atoms. The reaction between the alkoxylated silanes and hydroxylated polysiloxanes is promoted by catalysts such as organic amines, condensation products of an aliphatic aldehyde and an aliphatic primary amine, a carboxylic acid salts of metals higher than hydrogen in the electromotive force series of metals and organic titanium compounds. The quantity of catalyst is not critical and as little as 0.01 percent by weight is operative.

Another method for preparing the block copolymers (C) comprises cohydrolyzing a mixture of a polysiloxane having an average of at least two silicon-bonded hydrolyzable groups per molecule, where the polysiloxanes are the same as the hydroxylated polysiloxanes except that the hydroxyl radicals are replaced by hydrolyzable groups such as halogen atoms, or alkoxy atoms, with a hydrolyzable silane as previously defined.

The foregoing methods of preparing the organosilicon block copolymers of (C) are limited to diorganopolysiloxane blocks having 50 or less silicon atoms per block. Preparing block copolymers of (C) utilizing diorganopolysiloxane blocks having an average of 6 to 100 silicon atoms per block is accomplished by the following method.

The following method can be found in greater detail in the copending application of Robert C. Antonen, U.S. Serial No. 361,212, filed April 20, 1964, entitled "Method for Preparing Block Copolymers," which is hereby fully incorporated by reference.

Polymers of the average structure $$[(CH_3)_2SiO]_s[R'_2SiO]_t[R'SiO_{1.5}]_u$$

wherein the sum of $s+t+u$ has an average value from 6 to 100 inclusive, $t$ and $u$ each have a value up to 10 percent of the sum of $s+t+u$ and there is at least two radicals, either hydroxyl radicals or chlorine atoms per molecule are mixed with solvent, usually about one-half of the total amount of solvent used. The solvent can be any solvent previously used in the other methods of preparing the block copolymers (C), preferably toluene. The mixture of diorganopolysiloxane and solvent is mixed with enough water to give a final concentration of hydrogen halide from 5 to 15 weight percent based on the weight of the water. The hydrogen halide is usually formed during the hydrolysis step, but if alkoxy silanes or siloxanes are used in place of the halosilanes, normally employed, the hydrogen halide can be added to the mixture. Other hydrolysis catalyst besides the hydrogen halide can also be employed, such hydrolysis catalysts are acetic acid, toluene sulfonic acid, and hexafluoropropane sulfonic acid. Any catalyst used should be a catalyst which does not cause siloxane bond rearrangement. The diorganopolysiloxane, solvent and water are agitated to form a dispersion consisting of an organic phase and an aqueous phase. A mixture of solvent, about one-half the total amount used, and 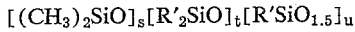$(C_6H_5)_q(CH_3)_wSiX_{4-w-q}$, wherein $q$ has an average value from 1 to 1.25 inclusive, X is a halogen, $w$ has an average value up to 0.25 inclusive, and the sum of $q+w$ does not exceed 1.25, is added to the above dispersion and stirred at least until the hydrolysis is completed. Alkoxysilanes and siloxanes as defined above are also operative, but an additional amount of condensation catalyst is required when these silanes and siloxanes are used. After the hydrolysis is complete the aqueous phase is separated and discarded. The residual hydrogen halide and water can be removed by azeotropic distillation from the organic phase, the product phase. After the removal of the residual acid and water the product can be heat bodied or bodied with a condensation catalyst such as zinc octoate. The solvent can be removed, if desired, by vacuum stripping, by spray drying, or by using a drum drier. The above method is usually carried out at 30 to 50 percent solids concentration. Any of the starting reactants as described for the other methods can be used in this method to prepare the block copolymers (C). The amounts of each ingredient has already been defined above.

Another method for preparing operable block copolymers (C) is described in detail in the copending U.S. application of Darrell D. Mitchell, U.S. Serial No. 309,867, filed September 18, 1963, now Patent No. 3,280,214, which is hereby fully incorporated by reference. The block copolymers (C) are prepared by reacting a hydroxylated organopolysiloxane of the formula $$HO[(CH_3)_2(SiO)_d(R'_2SiO)_e]H$$

wherein R' is a methyl, ethyl, phenyl or vinyl radical, $d$ is from 6 to 100 and $e$ is from 0 to 10, the sum of $d+e$ does not exceed 100 and there is an average of 1.9 to 2.0 organic radicals per silicon atom, with a coupling compound including 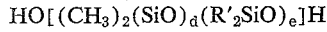$SiX_4$, $X_3SiOSiCl_3$, $X_3SiOSiBr_3$,

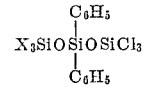

$$X_3SiO\underset{\underset{C_6H_5}{|}}{\overset{\overset{C_6H_5}{|}}{Si}}OSiCl_3$$

or $X_3Si$—$SiX_3$, where X is a halogen atom. There is at least one molecule of the coupling compound per hydroxyl group present in the hydroxylated organopolysiloxane. The hydroxylated organopolysiloxane is diluted to a suitable concentration with an organic solvent. The amount of the solvent used should be approximately half of the total amount of solvent necessary to make the final desired concentration which can be from 5 to 60 percent solids by weight. The organic solvent should be essentially free of moisture, immiscible with water, and non-reactive toward any of the ingredients. Suitable solvents are listed above with previously described methods. The hydroxylated organopolysiloxane and the coupling compound, both usually in a solution are mixed in the presence of an acid acceptor, previously defined. The reaction mixture is stirred until the reaction has been completed. The length of time the mixture is stirred is not critical and can vary from one minute to as much as 10 hours. The above reaction is carried out under essentially anhydrous conditions. After the above reaction is complete, silanes of the formula $(C_6H_5)_q(CH_3)_wSiX_{4-q-w}$, where X is a halogen and $q$ and $w$ have previously been defined, hydrolysis products of silanes or mixtures of the silanes and the hydrolyzed product are mixed with the reaction product between the hydroxylated organopolysiloxane and the coupling compound. The silanes and hydrolysis products thereof are added in amounts to produce block copolymers (C) which are operable in this invention. The mixture thus formed is hydrolyzed in the presence of water. If the reactants do not produce enough acid-by-product, additional condensation catalyst can be added. Condensation catalyst such as HCl, H₂SO₄ and acetic acid are operable. Also any other catalyst for the condensation of silicon-bonded hydroxyl groups can be used. After the hydrolysis and condensation are complete the aqueous layer is separated from the organic layer. The organic layer is neutralized by washing with water, dilute NaHCO₃, Na₂CO₃ and the like. It is then azeotroped dry or dried with materials such as anhydrous Na₂CO₃, Na₂SO₄ or K₂CO₃.

The release material of this invention can be used as a mixture of the three components (A), (B) and (C) per se. This is not the most convenient method of using the release material, but certain application find this very adaptable. Uses and application are presented below. The release material can be put into organic solvent solutions. Organic solvents conventionally used in polysiloxane art can be used. Suitable organic solvents include hydrocarbons such as heptane, cyclohexane, methylcyclopentane, benzene, toluene, xylene, naphtha and mineral spirits; halocarbons and halohydrocarbons such as perchloroethylene, tetrachlorodifluoroethane, chlorothene, trichlorotrifluoroethane, chlorobenzene, carbon tetrachloride, trichloromonofluoromethane, dichlorodifluoromethane, monochlorotrifluoromethane, carbon tetrafluoride, dichloromonofluoromethane, monochlorodifluoromethane, dichlorotetrafluoroethane, monochloropentafluoroethane, dibromodifluoromethane, monobromotrifluoromethane, trifluoromethane, dibromomonochlorotrifluoroethane, and dibromotetrafluoroethane; ethers such as diethyl ether, dibutyl ether, methylbutyl ether, methylamyl ether, and methylhexyl ether; halogenated ethers, such as 2,2'-dibromodiethyl ether, and 3,3'-dichlorodibutyl ether; ketones such as acetone, methylethyl ketone, methylbutylketone, mesityloxide, isophorone, and methylamylketone; and esters such as butylacetate, ethylacetate, isopropylacetate, amylacetate, ethylbutyrate, $CH_3COOC_2H_4OCH_3$, $CH_3COOC_2H_4OC_4H_9$, $CH_3COOC_2H_4OC_2H_4OC_2H_5$ and $CH_3COOC_2H_4OCOCH_3$.

The release material of this invention can also be put into an aqueous emulsion. The aqueous emulsion of the release material is prepared by conventional emulsifying techniques. The release material is emulsified with water and one or more emulsifying agents. The emulsifying agents can be cationic, anionic or nonionic. Any of the conventional emulsifying agents can be used, such as cationic emulsifying agents such as aliphatic fatty amines and their derivatives such as dodecylamine acetate, octadecylamine acetate and acetates of the amines of tallow fatty acids; homologues of aromatic amines having fatty chains such as dodecylanolin; fatty amides derived from aliphatic diamines such as undecylimidazoline; fatty amides derived from disubstituted amines such as oleylaminodiethylamine; derivatives of ethylene diamine; quaternary ammonium compounds such as dioctadecyldimethyl ammonium chloride, didodecyldimethyl ammonium chloride, and dihexadecyldimethyl ammonium chloride; amide derivatives of amino alcohols such as $\beta$-hydroxyethylstearylamide; amine salts of long chain fatty acids; quaternary ammonium bases derived from fatty amides of disubstituted diamines such as oleylbenzylaminoethylene diethylamine hydrochloride; quaternary ammonium bases of the benzimidazolines such as methylheptadecyl benzimidazol hydrobromide; basic compounds of pyridinium and its derivatives such as cetylpyridinium chloride; sulfonium compounds such as octadecylsulfonium methylsulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Suitable nonionic emulsifying agents are the saponines; condensation products of fatty acids with ethylene oxide such as dodecylether of tetraethylene oxide; condensation products of ethylene oxide and sorbitan monolaurate; condensation products of ethylene oxide and sorbitan trioleate and condensation products of phenolic compounds having side chains with ethylene oxide such as condensation products of ethylene oxide with isodecylphenol; condensation products of fatty alcohols and ethylene oxide such as octadecyl alcohol and ethylene oxide; and imine derivatives such as polymerized ethylene amine and N-octadecyl-N,N'-ethylene imide.

Suitable anionic emulsifying agents are alkali metal sulforicinates; sulfonated glyceryl esters of fatty acids such as sulfonated monoglycerides of coconut oil acids; salts of sulfonated monovalent alcohol esters such as sodium oleylisothionate; amides of amino sulfonic acids such as the sodium salt of oleylmethyltauride; sulfonated products of fatty acid nitriles such as palmitonitrile sulfonate; sulfonated aromatic hydrocarbons such as sodium $\alpha$-naphthalene monosulfonate; condensation products of naphthalene sulfonic acids with formaldehyde; sodium octahydroanthracene sulfonate and alkylarylsulfonates having one or several alkyl groups of 8 or less carbon atoms.

Also operable are mixtures of emulsifying agents, any of the emulsifying agents can be mixed except that the cationic emulsifying agents cannot be mixed with the anionic emulsifying agents.

The emulsions of the release material can have a wide variety of concentrations of ingredients. The emulsion can have from 0.1 to 60 weight percent release material based on the total weight of the emulsion, preferably 1 to 40 percent release material. The emulsion can have 0.1 to 10 weight percent of emulsifying agent in addition to the release material and the remainder water. The emulsion can also have up to 25 weight percent organic solvent, previously defined solvents for the release material, preferably the emulsion has up to 15 weight percent organic solvent.

The release materials of the present invention are particularly useful as release coatings for the release of burned food from surfaces. The release materials can be applied in several forms and in several methods. The release materials of this invention are particularly useful for coating ovens to prevent burned food and greases from adhering to the oven surface. Although the release materials are suitable as release coatings on surfaces other than an oven surface, the outstanding property of the release material is that it can be used in an oven with excellent results and provides an oven which is readily cleanable without the use of high potency cleaners and abrasives such as steel wool.

A release coating can be applied from an aerosol package. The compositions of release materials operable are those compositions having a diorganopolysiloxane (A) with a viscosity at 25° C. from 350 cs. to 750,000 cs. Preferably, the viscosity of (A) is from 1000 to 500,000 cs. at 25° C. The release material in an aerosol package can be applied from any conventional commercial aerosol package. The release material can be dissolved in an organic solvent. Any of the previously disclosed solvents for the release material can be used, but it is particularly advantageous to use organic solvents which are non-toxic and non-flammable, as a housewife is potentially the main consumer, although industrial bakeries and other food makers can also use this invention to advantage. Preferably then, the preferred organic solvents for release material in aerosol packages are those such as the halogenated organic solvents such as perchloroethylene, tetrachlorodifluoroethane, chlorothene, trichlorotrifluoroethane, trichloromonofluoromethane, dichlorodifluoromethane, monochlorotrifluoromethane, carbon tetrafluoride, dichloromonofluoromethane, dichlorotetrafluoroethane and monochloropentafluoroethane. Solvent such as those just named can be used alone or mixed with other solvents as previously described. The organic solvents used should include an aerosol propellent. Many of the halogenated solvents are in themselves propellents, but other conventional aerosol propellents can also be used. The release material can be in the organic solvent and packaged in aerosol packages, preferably the release material is present in amounts from 0.1 to 20 weight percent based on the weight of the total solution. Most preferably, the release material is present from 0.3 to 10 weight percent. The coating is sprayed from the aerosol package so that the mist comprising the release material and solvents covers the object to be coated, evenly and preferably in a thin film.

The release material can also be applied from a pretreated applicator such as from a pretreated cloth, a pretreated sponge or pretreated porous pad such as a felt pad containing the release material per se, or the release material in an organic solvent. The applicator should be pliable and porous. The pretreated applicator is prepared by a conventional method for getting the release material into the porous applicator. The porous applicator can be immersed in the release material until it has become saturated with the release material. The pretreated cloth or pad containing the release material can be applied to surfaces by rubbing or wiping. A slight pressure on the porous pretreated applicator causes the release material to come out of the applicator and be deposited on the surface such as an oven surface. Any concentrations of release material in organic solvent can be used, preferably when a cloth or pad is used, the organic solvent is present in as small amounts as possible, just enough to make it easy and convenient to apply. The preferred release materials for pretreated applicator are those in which (A) has a viscosity greater than 50,000 at 25° C.

Organic solvent solutions of the release material can also be used to dip parts to be coated. The organic solvent solutions can also be applied from any conventional bottle with a cloth or other similar device.

The release material can also be applied from an aqueous emulsion as previously disclosed. The aqueous emulsion of the release material can be applied from a conventional bottle with the aid of a cloth, a sponge, or other similar device; a squeeze bottle such as a polyethylene or polypropylene bottle, an aerosol package, or any other conventional container with or without spreading aids. The aqueous emulsion of the release material can be used in a concentrated form comprising such as 30 to 60 weight percent release material, 0.1 to 10 weight percent emulsifying agent and the remainder water. These concentrated emulsions can be used as such or diluted just before use. Preferably, the emulsions for use by a housewife are already in a dilute and easily applied form comprising preferably 0.5 to 10 weight percent release material, 0.1 to 5 weight percent emulsifying agent and the remainder water.

The release materials of the present invention are designed primarily for use in ovens, particularly ovens used for cooking of food. The release material, therefore, must pass several rigorous requirements. The release material of the present invention meets these requirements.

The release material is a mixture of three components, a diorganopolysiloxane (A), a phenylmethylpolysiloxane (B), and a siloxane block copolymer (C). The release material of the present invention is heat stable. The viscosity is stable over the temperature ranges involved in ovens. The release material does not decompose to any significant degree from room temperature up to 600° F. and is relatively heat stable even up to 800° F. The release material of the present invention retains its properties at 600° F. for more than 100 hours. The release material is clear and does not discolor over long periods of use. The release material is easy to apply in any form and in a variety of ways. The coating is durable. It will last over a long period of time retaining its release properties and it will retain effective release over long periods of time even at high temperatures. The release material will also release repeatedly from the same spot. The release material adheres firmly to the surfaces of ovens, such as metal, porcelain or enamel surfaces, and yet the release material can readily be removed from the oven surface. The release material will release burned food and greases readily. The burned foods and greases have a tendency to stain and the release material will prevent staining of the oven surface and will also develop only light stains itself which can readily be removed. The release material has good shelf stability. The release material is easy to replace. When a spot has become strained from repeated release of burned food the release material can readily be removed by scouring powder and very little rubbing, as little as once over with a cloth and scouring powder. Once removed either entirely, or in one spot, the release material can be easily replaced, such as by spraying with an aerosol package, wiping on a solution, using a pretreated cloth, or using an emulsion either from an aerosol package or a squeeze bottle with the aid of an applicator. There are no problems of the coating not adhering to the release material already present or to a surface which still retains a minute amount. The release material of the present invention can be applied over a surface which is not entirely clean and will function just as effectively as if the surface was absolutely clean from all traces of impurities. This is particularly of interest to a housewife who uses this release material. If she has recently cleaned the oven, but it was used since the cleaning and is not yet dirty enough for another cleaning, she can apply the release material directly on the oven surface without cleaning first. This saves her time and effort and also provides an oven which will be very readily cleanable when spillage from cooking and grease accumulation demands. An emulsion of the present release material is particularly advantageous for this purpose. The emulsion will clean the oven and at the same time deposit a coating of the release material over the cleaned surface. The exact reason why the emulsion is such a good cleaning agent and will also deposit a release coating on the surface is not entirely understood, but it is believed that the emulsifying agent, the release material and the water provide an especially effective means for solubilizing the dirt and grease, holding it in solution and depositing a release coating on the cleaned surface before the dirt and grease have an opportunity to redeposit on the cleaned surface. Besides the emulsifying agent other cleaning aids can also be added to the emulsion, such as hard surface cleaners such as trisodium phosphate.

The release material is also non-toxic, is non-flammable and solvent solutions can be made non-flammable by the proper selection of solvents when used, and is economical.

The release material is very useful for coating an oven whether it is a commercial oven or a home oven to prevent sticking of burned foods and greases and to make the oven readily cleanable without the use of caustics, ammonia, high potency solvents or steel wool. The release material should not contain curing agents or any ingredient which can degrade the polymer. Because the release material is completely satisfactory for an oven, the release material also has many other utilities, such as providing release of undesirable materials from porcelain, metal or enamelled surfaces.

The release material can be coated on skillets, cookie sheets, bread pans, cake pans, sauce pans, casseroles, waffle irons, and other cooking utensils where sticking of foods appear to be a problem. The release material can also be used, especially the emulsion, to prevent greases and food from adhering to refrigerator surfaces, the outside surfaces of stoves, tile surfaces and other surface areas of a kitchen where a grease film is likely to deposit. The emulsion will clean the surface at the same time it deposits a protective release coating. Another particularly useful application of the present release material is for coating indoor and outdoor barbecues, grills and the like. The barbecue can be coated almost entirely by the release material of this invention. The grill bars can be coated, the hood and accessory parts can be coated, and implements used can be coated. The release material makes cleaning the barbecue quick and easy. Also the food will not burn onto the bars, thus providing easy removal. The release coating can be applied by any of the previously discussed methods and as it is easy to apply, repeated application to the extremely hot areas where removal is frequent because of char formation can be done as often as needed.

The following examples are illustrative only and should not be construed as limiting the invention which is properly delineated in the appended claims.

*Example 1*

The preparation of a block copolymer (C). A dispersion was formed by mixing in a three-necked flask equipped with a thermometer and an agitator 222 g. of a hydroxylated essentially dimethylpolysiloxane having an average of 39 silicon atoms per molecule, 360 g. of toluene and 1900 g. of water, and enough agitation was applied to form a dispersion consisting of two phases, an essentially aqueous phase and an esesntially diorganopolysiloxane phase. In a quart container, 381 g. (1.8 moles) of phenyltrichlorosilane, 38 g. (0.2 mole) of phenylmethyldichlorosilane and 360 g. of toluene were mixed and then added to the above dispersion over a two minute period, there being sufficient agitation to maintain the dispersion. The temperature increased from 20° to 55° C. during the addition. The by-produced hydrogen chloride formed on the addition gave a 10 weight percent hydrogen chloride solution in water. The dispersion was stirred for 30 minutes after the addition. The aqueous phase was separated from the organopolysiloxane phase consisting of a block copolymer and toluene by decanting. The organopolysiloxane phase was washed once with water and then azeotroped until the temperature reached 116° C. at which time the solution had a solids content of 46.9 weight percent. The solvent was removed by vacuum stripping to 155° C.

A portion of the above siloxane block copolymer was bodied with 0.1 weight percent zinc octoate by refluxing a solution of the above block copolymer for 6.5 hours. The bodied block copolymer was vacuum stripped to 155° C. to remove the solvent.

*Example 2*

A release material was prepared by mixing 2.5 g. (83.4 weight percent) of an essentially trimethylsiloxy-endblocked dimethylpolysiloxane having a viscosity of 1000 cs. at 25° C., 0.25 g. (8.3 weight percent) of an essentially trimethylsiloxy-endblocked phenylmethylpolysiloxane having a viscosity of 500 cs. at 25° C. and 0.25 g. (8.3 weight percent) of the stripped bodied block copolymer of Example 1. A release material aerosol packaging composition was prepared by mixing the above release material in 27.0 g. of chlorothene, 32.0 g. of trichloromonofluoromethane and 38.0 g. of dichlorodifluoromethane. The release material aerosol packaging composition which was 3 weight percent release material was mixed in a conventional commercial aerosol package. An even thin film of release material was deposited on an enamelled panel by spraying with a mist from the aerosol package containing the release material aerosol packaging composition. The panel thus treated was heated in an oven to 425° F. for 15 minutes. A blob of cherry pie filling was deposited on the panel and baked for 15 minutes at 425° F. The burned pie filling was very easily removed by a very light tap. The pie filling could be removed repeatedly from the same spot on the panel when the test was repeated. The pie filling left a light stain which could very easily be removed with scouring powder and gentle rubbing. The removal of the release coating was accomplished by gentle rubbing with scouring powder and a paper towel. The release coating removed was readily replaced by spraying with an aerosol mist from the aerosol package containing the release material aerosol packaging composition.

*Example 3*

A release material was prepared by mixing 5.0 g. (83.4 weight percent) of an essentially trimethylsiloxy-endblocked dimethylpolysiloxane having a viscosity of 60,000 cs. at 25° C., 0.5 g. (8.3 weight percent) of the phenylmethylpolysiloxane of Example 2, and 0.5 g. (8.3 weight percent) of the stripped bodied block copolymer of Example 1. A release material aerosol packaging composition was prepared by mixing the above release material in 15.0 g. of chlorothene, 41.0 g. of trichloromonofluoromethane and 38.0 g. of dichlorodifluoromethane. The release material aerosol packaging composition which was 6 weight percent release material was mixed in a conventional commercial aerosol package. Using the same treatment and test as described in Example 2, the same results were observed. In addition to the test preformed in Example 2, the panel was heated for 16 hours at 600° F. and pie filling was deposited as in Example 2. The burned on pie filling released from the same spot seven times without reduction in release properties. No greater effort was required for the release of the burned on pie filling than was required in Example 2. The stain was lighter in color than the stain in Example 2.

*Example 4*

A release material aerosol packaging composition was prepared as in Example 3 except that the release material was composed of a mixture of 5.0 g. (76.9 weight percent) of the dimethylpolysiloxane of Example 3, 0.5 g. (7.7 weight percent) of the phenylmethylpolysiloxane of Example 2, and 1.0 g. (15.4 weight percent) of the stripped bodied siloxane block copolymer of Example 1. The treatment of panels and tests were preformed the same as those of Example 3, and the results were the same as those of Example 3, except the burned on pie filling slid off the panel when the panel was tilted.

*Example 5*

A release material was prepared by mixing 1.0 g. (25 weight percent) of the dimethylpolysiloxane of Example 3, 2.0 g. (50 weight percent) of the phenylmethylpolysiloxane of Example 2 and 1.0 g. (25 weight percent) of the stripped bodied block copolymer of Example 1. A release material aerosol packaging composition was prepared by mixing the above release material in 17.0 g. of chlorothene, 41.0 g. of trichloromonofluoromethane and 38.0 g. of dichlorodifluoromethane. The release material aerosol packaging composition which was 4 weight percent release material was mixed in a conventional commercial aerosol package. The same treatment and test as used in Example 2 were used with the same results.

*Example 6*

A release material was prepared by mixing 2.15 g. (32.2 weight percent) of the dimethylpolysiloxane of Example 3, 0.5 g. (7.5 weight percent) of the phenylmethylpolysiloxane of Example 2 and 4.0 g. (60.2 weight percent) of the stripped bodied block copolymer of Example 1. A release material aerosol package composition was prepared by mixing the above release material in 15.0 g. of chlorothene, 41.0 g. of trichloromonofluoromethane and 38.0 g. of dichlorodifluoromethane. The release material aerosol packaging composition which was 6.6 weight percent release material was mixed in a conventional commercial aerosol package. The tests were performed as in Example 2 on panels treated as in Example 2 with the results as follows. The pie filling was removed from the panel by rubbing with a paper towel. The remaining results were the same as those of Example 2.

*Example 7*

The following materials are presented for comparison only and are not to be considered part of the present invention. The materials are listed below with the results in the Table I. Each of the materials was applied as fluids to an enamelled panel. The fluids were spread out and wiped with an absorbent paper to provide a thin film. Each panel, thus treated, was heated for 15 minutes at 425° F. After the heating a blob of cherry pie filling was deposited on each panel and then heated for 15 minutes more at 425° F.

A. An essentially trimethylsiloxy-endblocked dimethylpolysiloxane having a viscosity of 350 cs. at 25° C.

B. An essentially trimethylsiloxy-endblocked dimethylpolysiloxane having a viscosity of 500 cs. at 25° C.

C. An essentially trimethylsiloxy-endblocked dimethylpolysiloxane having a viscosity of 1000 cs. at 25° C.

D. An essentially trimethylsiloxy-endblocked dimethylpolysiloxane having a viscosity of 12,500 cs. at 25° C.

E. An essentially trimethylsiloxy-endblocked dimethylpolysiloxane having a viscosity of 60,000 cs. at 25° C.

F. An essentially trimethylsiloxy-endblocked dimethylpolysiloxane having a viscosity of 600,000 cs. at 25° C.

G. An essentially trimethylsiloxy-endblocked dimethylpolysiloxane gum having a viscosity greater than 1,000,000 at 25° C.

H. An essentially trimethylsiloxy-endblocked phenylmethylpolysiloxane composed of phenylmethylsiloxane units and having a viscosity of 500 cs. at 25° C.

I. An essentially trimethylsiloxy-endblocked phenylmethylpolysiloxane composed of 65 mol percent phenylmethylsiloxane units and 35 mol percent dimethylsiloxane units and having a viscosity of 125 cs. at 25° C.

J. An essentially trimethylsiloxy-endblocked phenylmethylpolysiloxane composed of 12 mol percent phenylmethylsiloxane units and 88 mol percent of dimethylsiloxane units and having a viscosity of 500 cs. at 25° C.

K. A phenylmethylpolysiloxane as in J, except having a viscosity of 1000 cs.

L. A phenylmethylpolysiloxane having a viscosity of 500,000 cs. at 25° C.

M. A phenylmethylpolysiloxane having a viscosity of 1,000,000 cs. at 25° C.

N. An essentially diphenylmonomethylsiloxy - endblocked phenylmethylpolysiloxane composed of phenylmethylsiloxane units.

O. An essentially hydroxyl-endblocked dimethylpolysiloxane having a viscosity of 10,300 cs. at 25° C.

P. A toluene solution of the block copolymer of Example 1.

Q. 1.0 g. of the stripped block copolymer of Example 1, 4 drops of (H) and 9.0 g. of chlorothene.

R. 1.0 g. of the stripped block copolymer of Example 1, 4 drops of (J) and 9.0 g. of chlorothene.

S. 1.0 g. of the stripped block copolymer of Example 1, 4 drops of (C) and 9.0 g. of chlorothene.

T. A release composition composed of a mixture 90 weight percent of a resin prepared by hydrolyzing a mixture of $CH_3SiCl_3$, $C_6H_5SiCl_3$, $(CH_3)_2SiCl_2$ and $(C_6H_5)_2SiCl_2$ such that there is an average of 1.36 organic groups per silicon and the ratio of phenyl radicals to methyl radicals is 0.6 to 1, 9 weight percent of a phenylmethylpolysiloxane composed of phenylmethylsiloxane units and having 1 weight percent silicon-bonded hydroxyl radicals, and 1 weight percent of a trimethylsiloxy-endblocked dimethylpolysiloxane having viscosity of 30,000 cs. at 25° C. The siloxane ingredients are dissolved in a hydrocarbon solvent to make a 20 weight percent siloxane solution. A curing catalyst is present.

U. 5.0 g. of (M), 5 g. of (G) and 90 g. of chlorothene.

V. 3.3 g. of (M), 6.7 g. of (C), 29 g. of a hydrocarbon mixed solvent and 67 g. of chlorothene.

W. No coating on panel, control.

TABLE I

| Coating | Durability | Release properties | Remarks |
| --- | --- | --- | --- |
| Example 2 | Excellent | Excellent | |
| Example 3 | do | do | |
| Example 4 | do | do | |
| Example 5 | do | do | |
| Example 6 | do | Good | The pie filling can be removed by rubbing with a paper towel. |
| A | Very poor | Very poor | Requires caustic and ammonia to remove burned pie filling and stain. |
| B | do | do | Same as A. |
| C | Poor | Poor | Some of the burned on pie filling can be removed with effort, but scouring powder will not remove the remaining burned pie filling; requires oven cleaner or caustic to remove remaining stain and pie filling. |
| D | do | do | Same as C. |
| E | Fair | do | About half of the burned on pie filling can be removed with effort, but the remaining stain and pie filling cannot be removed with scouring powder. |
| F | do | do | About half of the burned on pie filling can be removed with less effort than E. Part of the remaining stain and pie filling can be removed with scouring powder, but caustic or oven cleaners are required to remove all the stain. |
| G | do | Fair | Can remove most of the burned on pie filling by rubbing, and most of the stain can be removed with scouring powder. Coating is hazy and difficult to apply. |
| H | Very poor | Very poor | Performance is better when no coating is used. |
| I | do | do | Same as H. |
| J | do | do | Same as H. |
| K | Poor | do | Same as H. |
| L | do | Poor | Application is fair, adhesion is fair, but only slightly better than no coating. |
| M | Fair | do | About one-half the pie filling can be removed with rubbing, and part of the pie filling and stain can be removed by scouring powder. |
| N | Very poor | Very poor | About the same as when no coating is present. |
| O | Poor | Poor | Same as C. |
| P | do | do | Requires strong oven cleaners to remove the pie filling. |
| Q | Very poor | Very poor | Only slightly better than when no coating is present. |
| R | do | do | Same as Q. |
| S | do | do | Same as Q. |
| T | Good | Fair | The composition requires cure to have any release properties at all. Release is good first time, but decreases rapidly upon repeated test. A stain left after removal of pie filling cannot be removed with oven cleaners, caustic and ammonia. Only way to remove stain is to remove coating which requires steel wool, an abrasive and vigorous rubbing. Good is given this coating for durability because it is very permanent, but loses its release properties rapidly. Fair is given this coating for release because it leaves a stain which requires extreme measures to remove. It is not easy to apply to an oven surface and is very difficult to replace. |
| U | Very poor | Very poor | Same as N. |
| V | Fair | Fair | About half of the filling can be removed and remainder can be removed with scouring powder. |
| W | Very poor | Very poor | A control, no coating. Requires caustic and ammonia to remove pie filling and stain. |

Example 8

A release material was prepared by mixing 0.5 g. (49.0 weight per cent) of an essentially trimethylsiloxy-endblocked dimethylpolysiloxane gum having a viscosity greater than 1,000,000 cs. at 25° C., 0.02 g. (2.0 weight percent) of an essentially trimethylsiloxy-endblocked phenylmethylpolysiloxane being composed of 12 mol percent phenylmethylsiloxane units and 88 mol percent dimethylsiloxane units and having a viscosity of 1000 cs. at 25° C. and 0.5 g. (49.0 weight percent) of a stripped siloxane block copolymer prepared as in Example 1, except that the proportions of reactants were 56 g. of an essentially hydroxyl-endblocked dimethylpolysiloxane having an average of 100 silicon atoms per molecule, 924 g. of toluene, 1656 g. of water, 333 g. (1.575 moles) of phenyltrichlorosilane and 33 g. (0.175 mole) of phenylmethyldichlorosilane. The release material was in 6.5 g. of toluene. The release material solution was wiped on an enamelled panel to provide a thin film. The coated panel was heated 15 minutes at 425° C. and then a blob of peach pie filling was deposited on the coated panel and heated another 15 minutes at 425° C. The burned peach pie filling was readily removable and a stain which remained could readily be removed by gently wiping with scouring powder and a paper towel.

Example 9

A release material was prepared by mixing 10.0 g. (64.5 weight percent) of an essentially trimethylsiloxy-endblocked dimethylpolysiloxane gum having a viscosity greater than 1,000,000 cs. at 25° C., 0.25 g. (1.6 weight percent) an essentially diphenylmonomethylsiloxy-endblocked phenylmethylpolysiloxane composed of phenylmethylsiloxane units, 0.25 g. (1.6 weight percent) of the trimethylsiloxy-endblocked phenylmethylpolysiloxane of Example 8 and 5.0 g. (32.3 weight percent) of the siloxane block copolymer of Example 8. The release material was dissolved in 42.4 g. of chlorothene and 42.4 g. of a commercial mixed hydrocarbon solvent. The panel was treated and tested as in Example 8, and instead of peach pie filling, cherry pie filling was used. The results were the same.

Example 10

A release material was prepared by mixing 4.19 g. (62.6 weight percent) of an essentially trimethylsiloxy-endblocked dimethylpolysiloxane having a viscosity of 60,000 cs. at 25° C., 0.50 g. (7.5 weight percent) of an essentially hydroxy-endblocked phenylmethylpolysiloxane having a viscosity of 1,000,000 cs. at 25° C. and 2.0 g. (29.9 weight percent) of the stripped siloxane block copolymer of Example 1. A release material aerosol packaging composition was prepared by mixing the above release material in 15 g. of chlorothene, 41 g. of trichloromonofluoromethane and 38 g. of dichlorodifluoromethane. The release material aerosol packaging composition which was 6.7 weight percent release material was mixed in a conventional commercial aerosol package. The release material aerosol packaging composition was tested according to the procedure of Example 2. The results obtained are the same as the results obtained in Example 2. A treated panel containing a blob of cherry pie filling was heated for 16 hours at 600° F. No deterioration in release properties was detectable. The coating released the burned on pie filling, the same as before the heating.

Example 11

A release material was prepared by mixing 2.5 g. (83.4 weight percent) of a trimethylsiloxy-endblocked dimethylpolysiloxane of Example 3, 0.25 g. (8.3 weight percent) of a trimethylsiloxy-endblocked phenylmethylpolysiloxane of Example 2, and 0.25 g. (8.3 weight percent) of a stripped siloxane block copolymer prepared as in Example 1, except that the block copolymer consisted of 60 mol percent of siloxane blocks of essentially dimethylsiloxane units having an average of 35 silicon atoms per block and 40 mol percent of siloxane blocks of $C_6H_5SiO_{1.5}$. A release material aerosol packaging composition was prepared by mixing the above release material in 18 g. of chlorothene, 41 g. of trichloromonofluoromethane, 38 g. of dichlorodifluoromethane. The release material aerosol packaging composition which was 3 weight percent release material was mixed in a conventional commercial aerosol package. The aerosol composition was sprayed on an enamelled panel and tested as in Example 2. The burned on pie filling could be removed by rubbing with a paper towel and the stain could be readily removed by using scouring powder.

Example 12

A release material was prepared by mixing 2.5 g. (83.4 weight percent) of the trimethylsiloxy-endblocked dimethylpolysiloxane of Example 3, 0.25 g. (8.3 weight percent) of the trimethylsiloxy-endblocked phenylmethylpolysiloxane of Example 2, and 0.25 g. (8.3 weight percent) of a stripped siloxane block copolymer prepared as in Example 1, except that the block copolymer consisted of 70 mol percent of siloxane blocks of essentially dimethylsiloxane units having an average of 35 silicone atoms per block and 30 mol percent of siloxane blocks composed of 90 mol percent of $C_6H_5SiO_{1.5}$ and 10 mol perecent of $(C_6H_5)(CH_3)SiO$. A release material aerosol packaging composition was prepared by mixing the above release material in 18 g. of chlorothene, 41 g. of trichloromonofluoromethane, 38 g. of dichlorodifluoromethane. The release material aerosol packaging composition which is 3 weight percent release material was mixed in a conventional commercial aerosol package. The release material was tested as in Example 2 and the results of the test compared with those of Example 2 except that the release properties were slightly less than those of Example 2. The releaes material provided a good coating for ovens.

Example 13

A release material prepared as in Example 12 was the same except that the siloxane block copolymer consisted of 55 mol percent of siloxane blocks of essentially dimethylsiloxane units having an average of 55 silicon atoms per block and 45 mol percent of siloxane blocks composed of 66.7 mol percent $C_6H_5SiO_{1.5}$ and 33.3 mol percent $(C_6H_5)(CH_3)SiO$. An aersol composition was prepared and tested as in Example 2 with equivalent results.

Example 14

A release material was prepared by mixing 4.0 g. (61.5 weight percent) of the trimethylsiloxy-endblocked dimethylpolysiloxane of Example 2, 0.5 g. (7.7 weight percent) of the trimethylsiloxy-endblocked phenylmethylpolysiloxane of Example 2, and 2.0 g. (30.8 weight percent) of the stripped siloxane block copolymer of Example 2. A release material aerosol packaging composition was prepared by mixing the above release material in 15 g. of chlorothene, 41 g. of trichloromonofluoromethane and 38 g. of dichlorodifluoromethane. The aerosol composition which was 6.5 weight percent release material was mixed in a conventional commercial aerosol package. A mist of the aerosol composition was evenly sprayed over one-half the cooking surface of an aluminum frying skillet, the other half of the cooking surface was untreated. Eggs were fried on both the treated and untreated surface. The eggs adhered to the untreated surface while there was no tendency for sticking on the treated surface. Hamburger and catsup were fried on both the treated and untreated surfaces of the skillet. The hamburger and catsup burned readily on the untreated surface as well as adhering to it. The hamburger and catsup did not adhere to the treated surface, nor did it burn easily. The skillet was washed with a strong liquid cleaner after the frying test and the tests were repeated. The results were the same after being washed as they were before being washed.

Example 15

The release material aerosol packaging composition of Example 3, was sprayed over an enamelled surface of a panel which had been cleaned with a caustic oven cleaner. The surface of the panel had caustic oven cleaner remaining on it. The release material provided a good film on the surface and when tested as in Example 3 with pie filling the release properties were uneffected after 15 minutes at 425° F. and after 16 hours at 500° F. The release material aerosol packaging composition was also applied to a panel having grease and pie filling remaining on the panel. The release material formed a film over both the grease and the pie filling and when tested with pie filling the release properties were unchanged.

Example 16

The release material aerosol packaging composition of Example 3 was sprayed on enamel panels to provide a thin film. The release properties were tested at various times and temperatures with a blob of pie filling. After 24 hours at 600° F., the release properties were unchanged from those shown in Example 3. After 48 hours at 500° F., followed by 24 hours at 600° F., the release properties were the same as after 24 hours at 600° F. After 90 hours at 600° F., the release properties were slightly less. The burned pie filling was removed by rubbing with a paper towel and the stain was readily removed with scouring powder.

Example 17

The release material aerosol packaging composition of Example 3 was sprayed on a panel and beef fat was placed on the treated panel and then the panel was heated at 440° to 500° F. for two hours. The burned beef fat could readily be removed from the panel by using scouring powder.

Example 18

A release material was prepared as in Example 3, except that the trimethylsiloxy-endblocked dimethylpolysiloxane was replaced with an essentially hydroxyl-endblocked dimethylpolysiloxane having a viscosity of 10,000 cs. at 25° C. A realease material aerosol packaging composition was prepared by mixing the above release material with 27 g. of chlorothene, 32 g. trichloromonofluoromethane and 38 g. of dichlorodifluoromethane. The aerosol composition which was 3 weight percent release material was mixed in a conventional commercial aerosol package. A panel was treated by spraying a mist of the aerosol composition to provide a thin film. The treated panel was heated at 425° to 450° F. for 0.5 hour and then a blob of peach pie filling was deposited on the panel and heated for 15 minutes at 425° F. The test results were the same as in Example 3.

Example 19

A release material was prepared the same as in Example 3, except that the siloxane block copolymer consisted of 25 mol percent of siloxane blocks consisting essentially of dimethylsiloxane units having an average of 35 silicon atoms per block and 75 mol percent of siloxane blocks consisting of 93.4 mol percent of $C_6H_5SiO_{1.5}$ units and 6.6 mol percent of $(C_6H_5)_2SiO$ units. The results were the same as shown by Example 3, when treated and tested using an aerosol composition.

Example 20

When any of the following essentially diorganopolysiloxanes are substituted for the trimethylsiloxy-endblocked dimethylpolysiloxane in Example 2, equivalent release materials are obtained.

A. An essentially dimethylpolysiloxane containing 5 mol percent monomethylsiloxane units, 3 mol percent trimethylsiloxane units and 2 mol percent silicon-bonded hydroxyl radicals and having a viscosity of 25,000 cs. at 25° C.

B. An essentially hydroxyl-endblocked diorganopolysiloxane composed of 90 mol percent dimethylsiloxane units and 10 mol percent phenylmethylsiloxane units and having a viscosity of 5,000 cs. at 25° C.

C. A diorganopolysiloxane composed of 95 mol percent dimethylsiloxane units, 5 mol percent ethylmethylsiloxane units and endblocked with dimethylvinylsiloxane units having a viscosity of 500,000 cs. at 25° C.

D. A diorganopolysiloxane composed of 98 mol percent dimethylsiloxane units and 2 mol percent methylvinylsiloxane units and endblocked with trimethylsiloxane units and having a viscosity of 75,000 cs. at 25° C.

E. A trimethylsiloxy-endblocked diorganopolysiloxane composed of 90 mol percent dimethylsiloxane units, 5 mol percent phenylmethylsiloxane units and 5 mol percent monomethylsiloxane units and having a viscosity of 750,000 cs. at 25° C.

Example 21

When any of the following phenylmethylpolysiloxanes are substituted for the phenylmethylpolysiloxane of Example 2, equivalent release materials are obtained.

A. An essentially trimethylsiloxy-endblocked phenylmethylpolysiloxane composed of 65 mol percent phenylmethylsiloxane units and having a viscosity of 125 cs. at 25° C.

B. An essentially monophenyldimethylsiloxy - endblocked phenylmethylpolysiloxane composed of 8 mol percent phenylmethylsiloxane units, 2 mol percent monomethylsiloxane units and 90 mol percent dimethylsiloxane units and having a viscosity of 500,000 cs. at 25° C.

C. $(C_6H_5)_3SiO[(C_6H_5)(CH_3)SiO]_{50}Si(C_6H_5)_3$.

D. An essentially trimethylsiloxy-endblocked phenylmethylpolysiloxane fluid composed of 10 mol percent of phenylmethylsiloxane units and 90 mol percent dimethylsiloxane units and having a viscosity of 50 cs. at 25° C.

Example 22

When 8.5 g. (85 weight percent) of an essentially trimethylsiloxy-endblocked dimethylpolysiloxane having a viscosity of 60,000 cs. at 25° C., 1.0 g. (10 weight percent) of the phenylmethylpolysiloxane (A) of Example 21, and 0.5 g. (5 weight percent) of a stripped siloxane block copolymer prepared as in Example 1 consisting of 35 mol percent siloxane blocks composed of dimethylsiloxane units and having 20 silicon atoms per block and 65 mol percent of siloxane blocks composed of 75 mol percent $C_6H_5SiO_{1.5}$ units and 25 mol percent $(C_6H_5)(CH_3)SiO$ units are mixed in 90 g. of xylene a release material solution is obtained. When the release material solution is applied to an oven surface with a cloth, the oven surface is readily cleanable from spilled pie filling, greases and casseroles. The burned on char can readily be removed by wiping with a cloth and any stains can be removed by scouring powder.

Example 23

When 5.0 g. (50 weight percent) of the dimethylpolysiloxane (A) of Example 20, 2.0 g. (20 weight percent) of the phenylmethylpolysiloxane (B) of Example 21, and 3.0 g. (30 weight percent) of a siloxane block copolymer composed of 45 mol percent of siloxane blocks of a diorganopolysiloxane consisting of 95 mol percent dimethylsiloxane units and 5 mol percent of phenylmethylsiloxane units and having an average of 72 silicon atoms per block, and 55 mol percent of siloxane blocks consisting of 95 mol percent $C_6H_5SiO_{1.5}$ units and 5 mol percent $CH_3SiO_{1.5}$ units are mixed in 35 g. of perchloroethylene and 30 g. of dibutyl ether, a release material solution is obtained. When the release material solution is applied to an oven, the surface becomes readily cleanable from any cooking ingredient deposited on the surface which char.

Example 24

When the siloxane block copolymer of Example 22 is replaced by a siloxane block copolymer having 70 mol percent siloxane blocks composed of dimethylsiloxane units and having 6 silicon atoms per block and 30 mol percent siloxane blocks composed of $C_6H_5SiO_{1.5}$ units, an equivalent release material is obtained.

Example 25

When 1.5 g. (15 weight percent) of the dimethylpolysiloxane of Example 3, 1.0 g. (10 weight percent) of the phenylmethylpolysiloxane of Example 2 and 7.5 g. (75 weight percent) of the siloxane block copolymer of Example 2 are mixed, an equivalent release material is obtained to that of Example 2.

Example 26

When a siloxane block copolymer consisting of 10 mol percent of siloxane blocks consisting of dimethylsiloxane units and having 35 silicon atoms per block and 90 mol percent of siloxane blocks composed of 90 mol percent $C_6H_5SiO_{1.5}$ units and 10 mol percent $(C_6H_5)(CH_3)SiO$ units is substituted for the siloxane block copolymer in Example 4, an equivalent release material is obtained.

Example 27

When any of the following solvents are used in place of the toluene used to put the release material in solution in Example 8, equivalent results are obtained: Cyclohexane, benzene, naphtha, chlorobenzene, methylamyl ether, methyl isobutyl ketone, butyl acetate and $$CH_3COOC_2H_4OCOCH_3$$

Example 28

When the release material of Example 3 is used to produce a release material aerosol packaging composition by mixing the release material with solvents, as follows, in conventional aerosol packages, equivalent results are obtained when a mist of the aerosol composition is deposited on an oven surface.

| Wt. Percent Release Material | Solvent Mixture |
| --- | --- |
| 0.1 | 55 weight percent chlorothene, 30 weight percent trichloromonofluoromethane, and 15 weight percent dichlorodifluoromethane. |
| 0.3 | 10 weight percent toluene, 45 weight percent dibromodifluoromethane, and 45 weight percent monochloropentafluoroethane. |
| 0.5 | 20 weight percent perchloroethylene and 80 weight percent dichlorotetrafluoroethane. |
| 1.0 | 30 weight percent chlorothene, 40 weight percent trichlorotrifluoroethane, and 30 weight percent monochlorodifluoromethane. |
| 10.0 | 5 weight percent xylene, 15 weight percent chlorothene, 45 weight percent dichloromonofluoromethane, and 35 weight percent dibromotetrafluoroethane. |
| 20.0 | 10 weight percent chlorothene, 60 weight percent trichloromonofluoromethane, and 30 weight percent monochloropentafluoroethane. |

Example 29

When 3.5 g. of the release material of Example 3 is dispersed in 92 g. of water with the aid of 4.5 g. of a condensation product of ethylene oxide and sorbitan monolaurate, and when a conventional high speed emulsifier is used for mixing, an emulsion is formed. When the emulsion is wiped on an oven surface, the oven surface is cleaned from grease film and other dirt and also a protective release film is deposited which prevents burned foods from adhering to the oven surface and the oven is readily cleanable. When a portion of the above aqueous emulsion is mixed in an aerosol package with a propellant, such as dichlorodifluoromethane, the release material in emulsion form can be sprayed from an aerosol package to deposit a film of emulsion which can be wiped over to both clean the oven surface and deposit a release coating on the oven surface.

Example 30

When any of the following compositions are emulsified as in Example 29, equivalent emulsions are formed.

*A.*
15.0 g. of the release material of Example 6
0.5 g. of sodium oleylisothionate
84.5 g. of water

*B.*
35.0 g. of the release material of Example 4
8.6 g. of the sodium salt of oleyl methyltauride
56.4 g. of water

*C.*
0.1 g. of the release material of Example 2
0.1 g. of methylheptadecyl benzimidazol hydrobromide
99.8 g. of water

*D.*
25.0 g. of the release material of Example 3
10.0 g. of β-hydroxyethylstearylamide
65.0 of water

*E.*
6.5 g. of the release material of Example 5
1.1 g. of a condensation product of stearic acid and diethylene triamine
6.0 g. of a condensation product of ethyleneoxide and isodecylphenol
86.4 g. of water

*F.*
40.0 g. of the release material of Example 13
10.0 g. of toluene
5.0 g. of sodium α-naphthalene monosulfonate
45.0 g. of water

Example 31

When the release material of Example 10 is used to saturate a very porous felt pad by immersing the felt pad in the release material, a pretreated applicator is formed. When the applicator is wiped with slight pressure over an oven surface, a film of the release material is deposited on the surface. Similar results are obtained, when the surface of a stove or a refrigerator is wiped with the pretreated applicator.

That which is claimed is:
1. A release material consisting essentially of
(A) a diorganopolysiloxane of the unit formula

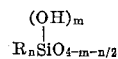

wherein
R is a monovalent radical selected from the group consisting of alkyl radicals, alkenyl radicals and aryl radicals,
n has an average value from 1.98 to 2.0145 inclusive, at least 90 percent of the silicon atoms having two methyl radicals per silicon atom bonded to the silicon atom through silicon-carbon bonds,
m has an average value of not more than 0.02, said diorganopolysiloxane having a viscosity of at least 350 cs. of 25° C., there being no more than 2 mol percent of the units with alkenyl radicals attached to the silicon atom through silicon-carbon bonds, the sum of $n+m$ does not exceed 2.0145,
(B) a phenylmethylpolysiloxane of the unit formula $(C_6H_5)_x(CH_3)_ySiO_{4-x-y/2}$, wherein
x has an average value from 0.08 to 1.1 inclusive,
y has an average value from 0.9 to 1.92 inclusive, the sum of $x+y$ is 2,
said phenylmethylpolysiloxane being endblocked with groups selected from the group consisting of hydroxyl radicals and triorganosiloxy units selected from the group consisting of $(CH_3)_3SiO_{0.5}$ $(C_6H_5)(CH_3)_2SiO_{0.5}$, $(C_6H_5)_2(CH_3)SiO_{0.5}$ and $(C_6H_5)_3SiO_{0.5}$, said phenylmethylpolysiloxane having a viscosity at 25° C. of at least 50 cs., and
(C) a block copolymer consisting essentially of
(1) polymer blocks of the average structure $[(CH_3)_2SiO]_s[R'_2SiO]_t[R'SiO_{1.5}]_u$ wherein
R' is a monovalent radical selected from the group consisting of methyl, ethyl, vinyl and phenyl radicals, the sum of
$s+t+u$ has an average value from 6 to 100 inclusive, and
$t$ and $u$ each have a value of up to 10 percent of the sum of $s+t+u$, and
(2) polymer blocks of the average unit formula $(C_6H_5)_q(CH_3)_wSiO_{4-w-q/2}$ wherein
$q$ has an average value from 1 to 1.25 inclusive,
$w$ has an average value of up to 0.25, and the sum of $q+w$ does not exceed 1.25, the siloxane units in (1) being from 10 to 75 mol percent and the siloxane units in (2) being from 25 to 90 mol percent of the total siloxane units in said block copolymer, the minimum mol percent of siloxane units (2) when the sum of $s+t+u$ has an average value from 50 to 100 being determined by the equation $50M/S+0.1S=30$, where M is the minimum mol percent of siloxane units (2), and S is the sum of $s+t+u$, there being present 10 to 85 inclusive weight percent of (A), 2 to 55 inclusive weight percent of (B), and 5 to 85 inclusive weight percent of (C), each weight percent being based on the combined of $(A)+(B)+(C)$.

2. A release material in accordance with claim 1 in which (A) is present in an amount of 20 to 85 weight percent, (B) is present in an amount of 4 to 50 weight percent, and (C) is present in an amount from 5 to 65 weight percent, each weight percent being based on the total weight of $(A)+(B)+(C)$.

3. A release material in accordance with claim 1 in which (A) is present in an amount of 45 to 85 weight percent, (B) is present in an amount of 5 to 20 weight percent, and (C) is present in an amount of 5 to 50 weight percent, each being based on the total weight of $(A)+(B)+(C)$.

4. A release material consisting essentially of
(A) a diorganopolysiloxane of the unit formula $$R_nSiO_{4-n-m/2}^{(OH)_m}$$

wherein
R is an alkyl radical,
$n$ has an average value from 2.0000 to 2.0121 inclusive,
$m$ has an average value of not more than 0.0121, the sum of $m+n$ does not exceed 2.0121,
at least 90 percent of the silicon atoms having two methyl radicals per silicon atom bonded to the silicon atom through silicon-carbon bonds, said diorganopolysiloxane having a viscosity of at least 500 cs. at 25° C.,
(B) a phenylmethylpolysiloxane of the unit formula $(C_6H_5)_x(CH_3)_ySiO_{4-x-y/2}$, wherein
$x$ has an average value from 0.5 to 1.0 inclusive,
$y$ has an average value from 1 to 1.5 inclusive, the sum of $x+y$ is 2,
said phenylmethylpolysiloxane being endblocked with triorganosiloxy units selected from the group consisting of $(CH_3)_3SiO_{0.5}$, $(C_6H_5)(CH_3)_2SiO_{0.5}$ $(C_6H_5)_2(CH_3)SiO_{0.5}$ and $(C_6H_5)_3SiO_{0.5}$, said phenylmethylpolysiloxane having a viscosity at 25° C. of at least 400 cs., and
(C) a block copolymer consisting essentially of
(1) polymer blocks of the average structure $[(CH_3)_2SiO]_s[R'_2SiO]_t[R'SiO_{1.5}]_u$, wherein R' is a monovalent radical selected from the group consisting of methyl, ethyl, vinyl and phenyl radicals, the sum of $s+t+u$ has an average value from 6 to 100 inclusive, and $t$ and $u$ each have a value of up to 10 percent of the sum of $s+t+u$, and
(2) polymer blocks of the average unit formula $(C_6H_5)_q(CH_3)_wSiO_{4-w-q/2}$, wherein
$q$ has an average value from 1 to 1.25 inclusive,
$w$ has an average value of up to 0.25, and the sum of $q+w$ does not exceed 1.25, the siloxane units in (1) being from 10 to 75 mol percent and the siloxane units in (2) being from 25 to 90 mol percent of the total siloxane units in said block copolymer, the minimum mol percent of siloxane units (2) when the sum of $s+t+u$ has an average value from 50 to 100 being determined by the equation $$50M/S+0.1S=30$$

wherein M is the minimum mol percent of siloxane units (2) and S is the sum of $s+t+u$, there being present 10 to 85 inclusive weight percent of (A), 2 to 55 inclusive weight percent of (B) and 5 to 85 inclusive weight percent of (C), each weight percent being based on the combined weight of $(A)+(B)+(C)$.

5. A release material in accordance with claim 4 in which (C) is a block copolymer consisting essentially of
(1) polymer blocks of the average structure $[(CH_3)_2SiO]_s[CH_3SiO_{1.5}]_u$ wherein the sum of $s+u$ has an average value from 20 to 75 inclusive, and $u$ has a value up to 5 percent of the sum of $s+u$, and
(2) polymer blocks of the average unit formula $(C_6H_5)_q(CH_3)_wSiO_{4-w-q/2}$ wherein
$q$ has an average value from 1 to 1.20 inclusive,
$w$ has an average value up to 0.20, and the sum of $q+w$ does not exceed 1.25,
the siloxane units in (1) being from 25 to 65 mol percent and the siloxane units in (2) being from 35 to 75 mol percent of the total siloxane in said block copolymer, the minimum mol percent of siloxane units (2) when the sum of $s+u$ has an average value from 50 to 75 being determined by the equation $50M/S+0.1S=30$, where M is the minimum mol percent of siloxane units (2), and S is the sum of $s+u$.

6. A release material in accordance with claim 4 in which (A) is present in an amount of 20 to 85 weight percent, (B) is present in an amount of 4 to 50 weight percent, and (C) is present in an amount from 5 to 65 weight percent, each weight percent being based on the total weight of $(A)+(B)+(C)$.

7. A release material in accordance with claim 4 in which (A) is present in an amount of 45 to 85 weight percent, (B) is present in an amount of 5 to 20 weight percent, and (C) is present in an amount of 5 to 50 weight percent, each weight percent being based on the total weight of $(A)+(B)+(C)$.

8. A release material in accordance with claim 5 in which (A) is present in an amount of 20 to 85 weight percent, (B) is present in an amount of 4 to 50 weight percent, and (C) is present in an amount from 5 to 65 weight percent, each weight percent being based on the total weight of $(A)+(B)+(C)$.

9. A release material in accordance with claim 5 in which (A) is present in an amount of 45 to 85 weight percent, (B) is present in an amount of 5 to 20 weight percent, and (C) is present in an amount of 5 to 50 weight percent, each weight percent being based on the total weight of $(A)+(B)+(C)$.

10. A release material in accordance with claim 1 in which (A) has a viscosity of at least 1000 cs. at 25° C.

11. A release material in accordance with claim 4 in which (A) has a viscosity of at least 1000 cs. at 25° C.

12. A release material in accordance with claim 1 in which (A) is $(CH_3)_3SiO[(CH_3)_2SiO]_pSi(CH_3)_3$, wherein $p$ has an average value of at least 135.

13. A release material in accordance with claim 12 in which $p$ has an average value of at least 165.

14. A release material in accordance with claim 12 in which $p$ has an average value of at least 225.

15. A release material in accordance with claim 4 in which (A) is $(CH_3)_3SiO[(CH_3)_2SiO]_pSi(CH_3)_3$, wherein $p$ has an average value of at least 165.

16. A release material in accordance with claim 15 in which $p$ has an average value from 225 to 1000 inclusive.

17. A release material in accordance with claim 5 in which (A) is $(CH_3)_3SiO[(CH_3)_2SiO]_pSi(CH_3)_3$, wherein $p$ has an average value from 225 to 1000 inclusive.

18. A release material consisting essentially of
(A) $(CH_3)_3SiO[(CH_3)_2SiO]_pSi(CH_3)_3$, wherein $p$ has an average value of at least 225,
(B) $(CH_3)_3SiO[(C_6H_5)(CH_3)SiO]_jSi(CH_3)_3$, wherein $j$ has an average value such that the viscosity is at least 400 cs. at 25° C., and
(C) a block copolymer consisting essentially of
   (1) polymer blocks of the average structure

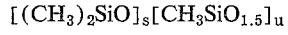

wherein the sum of
$s+u$ has an average value from 20 to 75 inclusive, and
$u$ has a value up to 5 percent of the sum of $s+u$, and
(2) polymer blocks of the average unit formula

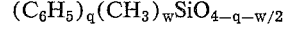

wherein
$q$ has an average value from 1 to 1.20 inclusive,
$w$ has an average value up to 0.20 inclusive, and the sum of $q+w$ does not exceed 1.25,
the siloxane units in (1) being from 25 to 65 mol percent and the siloxane units in (2) being from 35 to 75 mol percent of the total siloxane in said block copolymer, the minimum mol percent of siloxane units (2) when the sum of $s+u$ has an average value from 50 to 75 being determined by the equation $50M/S+0.1S=30$, where M is the minimum mol percent of siloxane units (2), and S is the sum of $s+u$, there being present 10 to 85 inclusive weight percent of (A), 2 to 55 inclusive weight percent of (B), and 5 to 85 inclusive weight percent of (C), each weight percent being based on the combined weight of $$(A)+(B)+(C)$$

19. A release material in accordance with claim 18 in which (A) is present in an amount from 20 to 85 weight percent, (B) is present in an amount from 4 to 50 weight percent, and (C) is present in an amount from 5 to 65 weight percent, each weight percent being based on the total weight of $(A)+(B)+(C)$.

20. A release material in accordance with claim 18 in which (A) is present in an amount from 45 to 85 weight percent, (B) is present in an amount from 5 to 20 weight percent, and (C) is present in an amount from 5 to 50 weight percent, each weight percent being based on the total weight of $(A)+(B)+(C)$.

21. A release material in accordance with claim 18 in which the sum of $s+u$ of (C)(1) has an average value from 20 to 50 inclusive, $u$ of (C)(1) has a value which does not exceed 2 mol percent of the sum of $s+u$, $q$ of (C)(2) has an average value from 1 to 1.18 inclusive, $w$ of (C)(2) has an average value from 0.02 to 0.20 inclusive, and the sum of $q+w$ does not exceed 1.20.

22. A release material in accordance with claim 18 in which $u$ of (C)(1) is 0, $q$ of (C)(2) has an average value from 1 to 1.11 inclusive, $w$ of (C)(2) has an average value from 0.04 to 0.15 inclusive and the sum of $q+w$ does not exceed 1.15.

23. A release material in accordance with claim 21 in which (A) is present in an amount from 20 to 85 weight percent, (B) is present in an amount from 4 to 50 weight percent, and (C) is present in an amount from 5 to 65 weight percent, each weight percent being based on the total weight of $(A)+(B)+(C)$.

24. A release material in accordance with claim 22 in which (A) is present in an amount from 45 to 85 weight percent, (B) is present in an amount from 5 to 20 weight percent, and (C) is present in an amount from 5 to 50 weight percent, each weight percent being based on the total weight of $(A)+(B)+(C)$.

25. A release material solution consisting essentially of the release material of claim 1 and an organic solvent.

26. A release material solution consisting essentially of the release material of claim 4 and an organic solvent.

27. A release material solution consisting essentially of the release material of claim 5 and an organic solvent.

28. A release material solution consisting essentially of the release material of claim 18 and an organic solvent.

29. A release material solution consisting essentially of the release material of claim 24 and an organic solvent.

30. A release material solution in accordance with claim 25 in which said release material is present in an amount from 0.1 to 20 weight percent based on the combined weight of the release material and the organic solvent.

31. A release material solution in accordance with claim 26 in which said release material is present in an amount from 0.1 to 20 weight percent based on the combined weight of the release material and the organic solvent.

32. A release material aerosol packaging composition comprising a release material consisting essentially of
(A) a diorganopolysiloxane of the unit formula

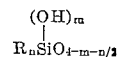

wherein
R is a monovalent radical selected from the group consisting of alkyl radicals, alkenyl radicals and aryl radicals,
$n$ has an average value from 1.98 to 2.0145 inclusive, at least 90 percent of the silicon atoms having two methyl radicals per silicon atom bonded to the silicon atom through silicon-carbon bonds,
$m$ has an average value of not more than 0.02, said diorganopolysiloxane having a viscosity from 350 cs. to 750,000 cs. at 25° C., there being no more than 2 mol percent of the units with alkenyl radicals attached to the silicon atom through silicon-carbon bonds, the sum of $n+m$ does not exceed 2.0145,
(B) a phenylmethylpolysiloxane of the unit formula $(C_6H_5)_x(CH_3)_ySiO_{4-x-y/2}$, wherein
$x$ has an average value from 0.08 to 1.1 inclusive,
$y$ has an average value from 0.9 to 1.92 inclusive, the sum of $x+y$ is 2,
said phenylmethylpolysiloxane being endblocked with groups selected from the group consisting of hydroxyl radicals and triorganosiloxy units selected from the group consisting of $(CH_3)_3SiO_{0.5}$, $(C_6H_5)(CH_3)_2SiO_{0.5}$, $(C_6H_5)_2(CH_3)SiO_{0.5}$ and $(C_6H_5)_3SiO_{0.5}$, said phenylmethylpolysiloxane having a viscosity at 25° C. from 50 cs. to 750,000 cs., and
(C) a block copolymer consisting essentially of
(1) polymer blocks of the average structure
$[(CH_3)_2SiO]_s[R'_2SiO]_t[R'SiO_{1.5}]_u$, wherein
R' is a monovalent radical selected from the group consisting of methyl, ethyl, vinyl and phenyl radicals, the sum of
$s+t+u$ has an average value from 6 to 100 inclusive, and $t$ and $u$ each have a value of up to 10 percent of the sum of $s+t+u$, and
(2) polymer blocks of the average unit formula
$(C_6H_5)_q(CH_3)_wSiO_{4-w-q/2}$, wherein
$q$ has an average value from 1 to 1.25 inclusive,
$w$ has an average value of up to 0.25 inclusive, and the sum of $q+w$ does not exceed 1.25,
the siloxane units in (1) being from 10 to 75 mol percent and the siloxane units in (2) being from 25 to 90 mol percent of the total siloxane units in said block copolymer, the minimum mol percent of siloxane units (2) when the sum of $s+t+u$ has an average value from 50 to 100 being determined by the equation $50M/S+0.1S=30$, where M is the minimum mol percent of siloxane units (2), and S is the sum of $s+t+u$, there being present 10 to 85 inclusive weight percent of (A), 2 to 55 inclusive weight percent of (B), and 5 to 85 inclusive weight percent of (C), each weight percent being based on the combined weight of $(A)+(B)+(C)$, said release material being present in an amount from 0.1 to 20 weight percent based on the total weight of the ingredients, an organic solvent, said organic solvent having at least one halogenated organic solvent present and an aerosol propellant.

33. A release material aerosol packaging composition in accordance with claim 32 in which said release material is present in an amount from 0.3 to 10 weight percent based on the total weight of the ingredients.

34. A release material aerosol packaging composition comprising a release material consisting essentially of
(A) a diorganopolysiloxane of the unit formula $$R_nSiO_{4-m-n/2}^{(OH)_m}$$

wherein,
R is an alkyl radical,
$n$ has an average value from 2.0000 to 2.0121 inclusive,
$m$ has an average value of not more than 0.0121, the sum of $m+n$ does not exceed 2.0121,
at least 90 percent of the silicon atoms having two methyl radicals per silicon atom bonded to the silicon atom through silicon-carbon bonds, said diorganopolysiloxane having a viscosity at 25° C. from 500 cs. to 750,000 cs.,
(B) a phenylmethylpolysiloxane of the unit formula $(C_6H_5)_x(CH_3)_ySiO_{4-x-y/2}$, wherein
$x$ has an average value from 0.5 to 1.0 inclusive,
$y$ has an average value from 1 to 1.5 inclusive, the sum of $x+y$ is 2,
said phenylmethylpolysiloxane being endblocked with triorganosiloxy units selected from the group consisting of $(CH_3)_3SiO_{0.5}$, $(C_6H_5)(CH_3)_2SiO_{0.5}$, $(C_6H_5)_2(CH_3)SiO_{0.5}$ and $(C_6H_5)_3SiO_{0.5}$, said phenylmethylpolysiloxane having a viscosity at 25° C. from 400 cs. to 750,000 cs., and (C) a block copolymer consisting essentially of
(1) polymer blocks of the average structure $[(CH_3)_2SiO]_s[CH_3SiO_{1.5}]_u$ wherein the sum of $s+u$ has an average value from 20 to 75 inclusive, and $u$ has a value up to 5 percent of the sum of $s+u$, and
(2) polymer blocks of the average formula $(C_6H_5)_q(CH_3)_wSiO_{4-w-q/2}$ wherein
$q$ has an average value from 1 to 1.20 inclusive,
$w$ has an average value up to 0.20 inclusive, and the sum of $q+w$ does not exceed 1.25,
the siloxane units in (1) being from 25 to 65 mol percent and the siloxane units in (2) being from 35 to 75 mol percent of the total siloxane in said block copolymer, the minimum mol percent of siloxane units (2) when the sum of $s+u$ has an average value from 50 to 75 being determined by the equation $50M/S+0.1S=30$, where M is the minimum mol percent of siloxane units (2), and S is the sum of $s+u$, there being present 10 to 85 inclusive weight percent of (A), 2 to 55 inclusive weight percent of (B), and 5 to 85 inclusive weight percent of (C), each weight percent being based on the combined weight of $(A)+(B)+(C)$, said release material being present in an amount from 0.1 to 20 weight percent based on the total weight of the ingredients, an organic solvent, said organic solvent having at least one halogenated organic solvent present and an aerosol propellant.

35. A release material aerosol packaging composition in accordance with claim 34 in which said release material is present in an amount from 0.3 to 10 weight percent based on the total weight of the ingredients.

36. A release material aerosol packaging composition comprising a release material consisting essentially of
(A) $(CH_3)_3SiO[(CH_3)_2SiO]_pSi(CH_3)_3$, wherein $p$ has an average value from 225 to 1635,
(B) $(CH_3)_3SiO[(C_6H_5)(CH_3)SiO]_jSi(CH_3)_3$, wherein $j$ has an average value such that the viscosity at 25° C. is from 400 cs. to 750,000 cs., and
(C) a block copolymer consisting essentially of
(1) polymer blocks of the average structure
$[(CH_3)_2SiO]_s[CH_3SiO_{1.5}]_u$, wherein the sum of $s+u$ has an average value from 20 to 75 inclusive, and $u$ has a value up to 5 percent of the sum of $s+u$, and
(2) polymer blocks of the average unit formula
$(C_6H_5)_q(CH_3)_wSiO_{4-q-w/2}$, wherein $q$ has an average value from 1 to 1.20 inclusive, $w$ has an average value up to 0.20 inclusive, and the sum of $q+w$ does not exceed 1.25,
the siloxane units in (1) being from 25 to 65 mol percent and the siloxane units in (2) being from 35 to 75 mol percent of the total siloxane in said block copolymer, the minimum mol percent of siloxane units (2) when the sum of $s+u$ has an average value from 50 to 75 being determined by the equation $50M/S+0.1S=30$, where M is the minimum mol percent of siloxane units (2), and S is the sum of $s+u$, there being present 10 to 85 inclusive weight percent of (A), 2 to 55 inclusive weight percent of (B), and 5 to 85 inclusive weight percent of (C), each weight percent being based on the combined weight of $(A)+(B)+(C)$, said release material being present in an amount from 0.1 to 20 weight percent based on the total weight percent of the ingredients, an organic solvent, said organic solvent having at least one halogenated organic solvent present and an aerosol propellant.

37. A release material aerosol packaging composition in accordance with claim 36, in which said release material is present in an amount from 0.3 to 10 weight percent based on the total weight of the ingredients.

38. A release material aerosol packaging composition comprising a release material consisting essentially of (A) $(CH_3)_3SiO[(CH_3)_2SiO]_pSi(CH_3)_3$, wherein $p$ has an average value from 225 to 1635,
(B) $(CH_3)_3SiO[(C_6H_5)(CH_3)SiO]_jSi(CH_3)_3$, wherein $j$ has an average value such that the viscosity at 25° C. is from 400 cs. to 750,000 cs., and
(C) a block copolymer consisting essentially of
(1) polymer blocks of $[(CH_3)_2SiO]_s$, wherein $s$ has an average value from 20 to 75 inclusive,
(2) polymer blocks of the average unit formula $(C_6H_5)_q(CH_3)_wSiO_{4-q-w/2}$, wherein
$q$ has an average value from 1 to 1.11 inclusive,
$w$ has an average value from 0.04 to 0.15 inclusive,
and the sum of $q+w$ does not exceed 1.15,
the siloxane units in (1) being from 25 to 65 mol percent and the siloxane units in (2) being from 35 to 75 mol percent of the total siloxane in said block copolymer, the minimum mol percent of siloxane units (2) when $s$ has an average value from 50 to 75 being determined by the equation $50M/S + 0.1S = 30$, where M is the minimum mol percent of siloxane units (2), and S is $s$, there being present from 45 to 85 weight percent of (A), from 5 to 20 weight percent of (B), and from 5 to 50 weight percent of (C), each weight percent being based on the total weight of $(A)+(B)+(C)$, said release material being present in an amount from 0.1 to 20 weight percent based on the total weight of the ingredients an organic solvent, said organic solvent having at least one halogenated organic solvent present and an aerosol propellant.

39. A release material aerosol packaging composition in accordance with claim 38 in which said release material is present in an amount from 0.3 to 10 weight percent based on the total weight of the ingredients.

40. A release material aerosol packaging composition in accordance with claim 32 in which said organic solvent is composed of chlorothene, trichloromonofluoromethane and dichlorodifluoromethane.

41. A release material aerosol packaging composition in accordance with claim 34 in which said organic solvent is composed of chlorothene, trichloromonofluoromethane and dichlorodifluoromethane.

42. A release material aerosol packaging composition in accordance with claim 36 in which said organic solvent is composed of chlorothene, trichloromonofluoromethane and dichlorodifluoromethane.

43. A release material aerosol packaging composition in accordance with claim 38 in which said organic solvent is composed of chlorothene, trichloromonofluoromethane and dichlorodifluoromethane.

44. An aqueous emulsion comprising from 0.1 to 60 weight percent of the release material of claim 1, from 0.1 to 10 weight percent of an emulsifying agent and water, the weight percent being based on the total weight of the ingredients.

45. An aqueous emulsion comprising from 0.1 to 60 weight percent of the release material of claim 4, from 0.1 to 10 weight percent of an emulsifying agent and water, the weight percent being based on the total weight of the ingredients.

46. An aqueous emulsion comprising from 0.1 to 60 weight percent of the release material of claim 9, from 0.1 to 10 weight percent of an emulsifying agent and water, the weight percent being based on the total weight of the ingredients.

47. An aqueous emulsion comprising from 0.1 to 60 weight percent of the release material of claim 14, from 0.1 to 10 weight percent of an emulsifying agent and water, the weight percent being based on the total weight of the ingredients.

48. An aqueous emulsion comprising from 0.1 to 60 weight percent of the release material of claim 22, from 0.1 to 10 weight percent of an emulsifying agent and water, the weight percent being based on the total weight of the ingredients.

49. An aqueous emulsion in accordance with claim 44 in which the release material is present in an amount from 1.0 to 40 weight percent.

50. An aqueous emulsion in accordance with claim 46 in which the release material is present in an amount from 1.0 to 40 weight percent.

51. An aqueous emulsion in accordance with claim 48 in which the release material is present in an amount from 1.0 to 40 weight percent.

52. An aqueous emulsion in accordance with claim 49 in which there is present an organic solvent in an amount up to 25 weight percent.

53. An aqueous emulsion in accordance with claim 50 in which there is present an organic solvent in an amount up to 25 weight percent.

54. An aqueous emulsion in accordance with claim 51 in which there is present an organic solvent in an amount up to 25 weight percent.

55. An aqueous emulsion in accordance with claim 51 in which there is present an organic solvent in an amount up to 15 weight percent.

56. An aerosol packaging emulsion comprising from 0.1 to 10 weight percent of a release material consisting essentially of
(A) a diorganopolysiloxane of the unit formula

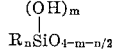

wherein
R is a monovalent radical selected from the group consisting of alkyl radicals, alkenyl radicals and aryl radicals,
$n$ has an average value from 1.98 to 2.0145 inclusive, at least 90 percent of the silicon atoms having two methyl radicals per silicon atom bonded to the silicon atom through silicon-carbon bonds,
$m$ has an average value of not more than 0.02, said diorganopolysiloxane having a viscosity from 350 cs. to 750,000 cs. at 25° C., there being no more than 2 mol percent of the units with alkenyl radicals attached to the silicon atom through silicon-carbon bonds, the sum of $n+m$ does not exceed 2.0145,
(B) a phenylmethylpolysiloxane of the unit formula

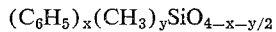

wherein
$x$ has an average value from 0.08 to 1.1 inclusive,
$y$ has an average value from 0.9 to 1.92 inclusive,
the sum of $x+y$ is 2,
said phenylmethylpolysiloxane being endblocked with groups selected from the group consisting of hydroxyl radicals and triorganosiloxy units selected from the group consisting of $(CH_3)_3SiO_{0.5}$, $(C_6H_5)(CH_3)_2SiO_{0.5}$, $(C_6H_5)_2(CH_3)SiO_{0.5}$ and $(C_6H_5)_3SiO_{0.5}$, said phenylmethylpolysiloxane having a viscosity at 25° C., from 50 cs. to 750,000 cs., and
(C) a block copolymer consisting essentially of
(1) polymer blocks of the average structure $[(CH_3)_2SiO]_s[R'_2SiO]_t[R'SiO_{1.5}]_u$, wherein R' is a monovalent radical selected from the group consisting of methyl, ethyl, vinyl and phenyl radicals, the sum of $s+t+u$ has an average value from 6 to 100 inclusive,
and $t$ and $u$ each have a value of up to 10 percent of the sum of $s+t+u$, and
(2) polymer blocks of the average unit formula $(C_6H_5)_q(CH_3)_wSiO_{4-w-q/2}$ wherein
$q$ has an average value from 1 to 1.25 inclusive,
$w$ has an average value of up to 0.25 inclusive, and the sum of $q+w$ does not exceed 1.25., the siloxane units in (1) being from 10 to 75 mol percent and the siloxane units in (2) being from 25 to 90 mol percent of the total siloxane units in said block copolymer, the minimum mol percent of siloxane units (2) when the sum of $s+t+u$ has an average value from 50 to 100 being determined by the equation $$50M/S+0.1S=30$$

where M is the minimum mol percent of siloxane units (2), and S is the sum of $s+t+u$, there being present 10 to 85 inclusive weight percent of (A), 2 to 55 inclusive weight percent of (B), and 5 to 85 inclusive weight percent of (C), each weight percent being based on the combined weight of $(A)+(B)+(C)$, 0.1 to 10 weight percent of an emulsifying agent, water and an aerosol propellant.

57. An aerosol packaging emulsion comprising from 0.1 to 10 weight percent of a release material consisting essentially of
(A) a diorganopolysiloxane of the unit formula $$R_nSiO_{4-m-n/2}^{(OH)_m}$$

wherein
R is an alkyl radical,
n has an average value from 2.0000 to 2.0121 inclusive,
m has an average value of not more than 0.0121, the sum of $m+n$ does not exceed 2.0121, at least 90 percent of the silicon atoms having two methyl radicals per silicon atom bonded to the silicon atom through silicon-carbon bonds, said diorganopolysiloxane having a viscosity from 1000 cs. to 750,000 cs. at 25° C.,
(B) a phenylmethylpolysiloxane of the unit formula $(C_6H_5)_x(CH_3)SiO_{4-x-y/2}$, wherein
x has an average value from 0.5 to 1.0 inclusive,
y has an average value from 1 to 1.5 inclusive, the sum of $x+y$ is 2,
said phenylmethylpolysiloxane being endblocked with triorganosiloxy units selected from the group consisting of $$(CH_3)_3SiO_{0.5}$$
$$(C_6H_5)(CH_3)_2SiO_{0.5}$$
$$(C_6H_5)_2(CH_3)SiO_{0.5}$$

and
$$(C_6H_5)_3SiO_{0.5}$$

said phenylmethylpolysiloxane having a viscosity at 25° C. from 400 cs. to 750,000 cs., and
(C) a block copolymer consisting essentially of
(1) polymer blocks of the average structure $$[(CH_3)_2SiO]_s[R'_2SiO]_t[R'SiO_{1.5}]_u$$

wherein
R' is a monovalent radical selected from the group consisting of methyl, ethyl, vinyl and phenyl radicals, the sum of $s+t+u$ has an average value from 6 to 100 inclusive, and t and u each have a value up to 10 percent of the sum of $s+t+u$, and
(2) polymer blocks of the average unit formula $(C_6H_5)_q(CH_3)_wSiO_{4-w-q/2}$, wherein q has an average value from 1 to 1.25 inclusive, w has an average value of up to 0.25 inclusive, and the sum of $q+w$ does not exceed 1.25,
the siloxane units in (1) being from 10 to 75 mol percent and the siloxane units in (2) being from 25 to 90 mol percent of the total siloxane units said block copolymer, the minimum mol percent of siloxane units (2) when the sum of $s+t+u$ has an average value from 50 to 100 being determined by the equation $50M/S+0.1S=30$, where M is the minimum mol percent of siloxane units (2) and S is the sum of $s+t+u$, there being present 10 to 85 inclusive weight percent of (A), 2 to 55 inclusive weight percent of (B) and 5 to 85 inclusive weight percent of (C), each weight percent being based on the combined weight of $(A)+(B)+(C)$, 0.1 to 10 weight percent of an emulsifying agent, water and an aerosol propellant.

58. An aerosol packaging emulsion comprising from 0.1 to 10 weight percent of a release material consisting essentially of
(A) $(CH_3)_3SiO[(CH_3)_2SiO]_pSi(CH_3)_3$, wherein p has an average value from 225 to 1635,
(B) $(CH_3)_3SiO[(C_6H_5)(CH_3)SiO]_jSi(CH_3)_3$, wherein j has an average value such that the viscosity is from 400 cs. to 750,000 cs. at 25° C., and
(C) a block copolymer consisting essentially of
(1) polymer blocks of the average structure $$[(CH_3)_2SiO]_s$$

wherein s has an average value from 20 to 75 inclusive,
(2) polymer blocks of the average unit formula $(C_6H_5)_q(CH_3)_wSiO_{4-w-q/2}$, wherein
q has an average value from 1 to 1.11,
w has an average value from 0.04 to 0.15 inclusive, and the sum of $q+w$ does not exceed 1.15,
the siloxane units in (1) being from 25 to 65 mol percent and the siloxane units in (2) being from 35 to 75 mol percent of the total siloxane in said block copolymer, the minimum mol percent of the siloxane units (2) when s has an average value from 50 to 75 being determined by the equation $50M/S+0.1S=30$, where M is the minimum mol percent of siloxane units (2), and S is s, there being present 45 to 85 inclusive weight percent of (A), 5 to 20 inclusive weight percent of (B), and 5 to 50 inclusive weight percent of (C), each weight percent being base on the combined weight of $(A)+(B)+(C)$, 0.1 to 10 weight percent of an emulsifying agent, water and an aerosol propellant.

59. An aerosol packaging emulsion in accordance with claim 58 in which the aerosol propellent is a halogenated organic solvent selected from the group consisting of trichloromonofluoromethane and dichlorodifluoromethane.

60. An aerosol packaging emulsion in accordance with claim 59 in which the emulsifying agent is a non-ionic emulsifying agent.

61. A pretreated applicator comprising a flexible absorbant porous substrate essentially saturated with the release material of claim 1.

62. A pretreated applicator comprising an absorbant porous pad essentially saturated with the release material of claim 1.

63. A pretreated applicator comprising an absorbant porous cloth essentially saturated with the release material of claim 1.

64. A pretreated applicator comprising an absorbant porous sponge essentially saturated with the release material of claim 1.

65. A pretreated applicator in accordance with claim 62 in which the absorbant porous pad is a felt pad.

66. A pretreated applicator in accordance with claim 63 in which the absorbant porous cloth is cotton.

67. A pretreated applicator in accordance with claim 63 in which the absorbant porous cloth is wool.

68. An oven surface coated with the release material of claim 1.

69. A skillet surface coated with the release material of claim 1.

70. A porcelain surface coated with the release material of claim 1.

71. A metal surface coated with the release material of claim 1.

72. An enamelled surface coated with the release material of claim 1.

73. A barbecue surface coated with the release material of claim 1.

References Cited by the Examiner
UNITED STATES PATENTS

| | | | |
|---|---|---|---|
| 2,793,197 | 5/1957 | Brown | 260—33.8 |
| 2,833,441 | 5/1958 | Hedlund | 260—29.1 |
| 3,002,946 | 10/1961 | Thomas | 260—29.1 |
| 3,202,542 | 8/1965 | Poje | 260—29.1 |
| 3,231,532 | 1/1966 | Modic | 260—29.1 |

MURRAY TILLMAN, *Primary Examiner.*

JOHN C. BLEUTGE, *Assistant Examiner.*